(12) United States Patent
Huang et al.

(10) Patent No.: US 11,552,751 B2
(45) Date of Patent: Jan. 10, 2023

(54) METHOD AND APPARATUS FOR DETERMINING SLOT FORMAT IN A WIRELESS COMMUNICATION SYSTEM

(71) Applicant: ASUSTek Computer Inc., Taipei (TW)

(72) Inventors: Chun-Wei Huang, Taipei (TW); Jia-Hong Liou, Taipei (TW)

(73) Assignee: ASUSTek Computer Inc., Taipei (TW)

( * ) Notice: Subject to any disclaimer, the term of this patent is extended or adjusted under 35 U.S.C. 154(b) by 20 days.

(21) Appl. No.: 16/516,980

(22) Filed: Jul. 19, 2019

(65) Prior Publication Data

US 2020/0028659 A1    Jan. 23, 2020

Related U.S. Application Data

(60) Provisional application No. 62/701,214, filed on Jul. 20, 2018.

(51) Int. Cl.
| | |
|---|---|
| *H04L 5/00* | (2006.01) |
| *H04L 1/00* | (2006.01) |
| *H04W 72/04* | (2009.01) |
| *H04L 27/26* | (2006.01) |

(52) U.S. Cl.
CPC ............ *H04L 5/001* (2013.01); *H04L 1/0006* (2013.01); *H04L 5/0094* (2013.01); *H04L 27/2602* (2013.01); *H04W 72/042* (2013.01); *H04W 72/0446* (2013.01); *H04W 72/0453* (2013.01); *H04L 27/26025* (2021.01)

(58) Field of Classification Search
None
See application file for complete search history.

(56) References Cited

U.S. PATENT DOCUMENTS

| | | | | |
|---|---|---|---|---|
| 2018/0146439 A1* | 5/2018 | Kim | ............ | H04W 52/322 |
| 2018/0309513 A1* | 10/2018 | Kim | ............ | H04L 5/1469 |
| 2019/0089583 A1* | 3/2019 | Islam | ............ | H04L 5/0053 |
| 2019/0166066 A1* | 5/2019 | Ang | ............ | H04L 47/821 |

(Continued)

OTHER PUBLICATIONS

3GPP, TS 38.213, Jun. 2018, 3GPP, v15.2.0, p. 1-99.*

(Continued)

*Primary Examiner* — Alpus Hsu
*Assistant Examiner* — Camquyen Thai
(74) *Attorney, Agent, or Firm* — Cooper Legal Group LLC

(57) ABSTRACT

A method and apparatus are disclosed from the perspective of a network. In one embodiment, the method includes the network configuring a DL (Downlink) BWP (Bandwidth Part) and an UL (Uplink) BWP in a first serving cell to a UE (User Equipment). The method also includes the network configuring a paired spectrum operation in the first serving cell to the UE. The method further includes the network transmitting a first DCI (Downlink Control Information) to the UE, wherein the first DCI comprises a slot format combination indicating one or more slot format values for the DL BWP and one or more slot format values for the UL BWP. In addition, the method includes the network prevents from setting an amount of slot format values in the slot format combination in the first DCI to be not divided by a first number, wherein the first number is associated with an absolute value of a difference of a first SCS (Subcarrier Spacing) configuration and a second SCS configuration.

16 Claims, 19 Drawing Sheets

(56) References Cited

U.S. PATENT DOCUMENTS

| | | | | |
|---|---|---|---|---|
| 2019/0306700 | A1* | 10/2019 | Lin | H04W 74/0833 |
| 2019/0312665 | A1* | 10/2019 | Jo | H04L 5/0094 |
| 2020/0136882 | A1* | 4/2020 | Jo | H04L 5/0048 |
| 2020/0229270 | A1* | 7/2020 | Chatterjee | H04W 80/08 |
| 2020/0374967 | A1* | 11/2020 | Nogami | H04L 1/0061 |

OTHER PUBLICATIONS

Huawei et al: "TP on UE behavior for determining slot format", 3GPP Draft; R1-1801779, 3rd Generation Partnership Project (3GPP), Mobile Competence Centre ; 650, Route Des Lucioles ; F-06921 Sophia-Antipolis Cedex France vol. RAN WG1, No. Athens, Greece; Feb. 26, 2018-Mar. 2, 2018 Feb. 17, 2018 (Feb. 17, 2018), XP051397753.

Nokia et al: "Proposed corrections for the slot configuration in 38.213", 3GPP Draft; R1-1806656_Slot Configuration—Final, 3rd Generation Partnership Project (3GPP), Mobile Competence Centre ; 650, Route Des Lucioles ; F-06921 Sophia-Antipolis Cedex ;France » vol. RAN WG1, No. Busan, Republic of Korea; May 21, 2018-May 25, 2018 May 11, 2018 (May 11, 2018), XP051461902.

Qualcomm Incorporated: "TP for agreements for SFI", 3GPP Draft; R1-1803515_TP for Agreements for SFI, 3rd Generation Partnership Project (3GPP), Mobile Competence Centre ; 650, Route Des Lucioles ; F-06921 Sophia-Antipolis Cedex ; France vol. RAN WG1, No. Athens, Greece; Feb. 26, 2018-Mar. 2, 2018 Mar. 5, 2018 (Mar. 5, 2018), XP051398813.

European Search Report from corresponding EP Application No. 19187233.2, dated Dec. 12, 2019.

3GPP TSG RAN WG1 Meeting #92, R1-1801623, Athens, Greece, Feb. 26- Mar. 2, 2018.

ZTE, Sanechips, "Remaining Issues for Slot Format", 3GPP TSG RAN WG1 Meeting #92, R1-1801623, Documents for Discussion and Decision, Agenda Item 7.1.3.1.3, Feb. 26-Mar. 2, 2018, Athens Greece.

Corresponding European Patent Application No. 19187233.2, Office Action dated Oct. 21, 2020.

* cited by examiner

| Format | Symbol number in a slot | | | | | | | | | | | | | |
|---|---|---|---|---|---|---|---|---|---|---|---|---|---|---|
| | 0 | 1 | 2 | 3 | 4 | 5 | 6 | 7 | 8 | 9 | 10 | 11 | 12 | 13 |
| 0 | D | D | D | D | D | D | D | D | D | D | D | D | D | D |
| 1 | U | U | U | U | U | U | U | U | U | U | U | U | U | U |
| 2 | F | F | F | F | F | F | F | F | F | F | F | F | F | F |
| 3 | D | D | D | D | D | D | D | D | D | D | D | D | D | F |
| 4 | D | D | D | D | D | D | D | D | D | D | D | D | F | F |
| 5 | D | D | D | D | D | D | D | D | D | D | D | F | F | F |
| 6 | D | D | D | D | D | D | D | D | D | D | F | F | F | F |
| 7 | D | D | D | D | D | D | D | D | D | F | F | F | F | F |
| 8 | F | F | F | F | F | F | F | F | F | F | F | F | F | U |
| 9 | F | F | F | F | F | F | F | F | F | F | F | F | U | U |
| 10 | F | U | U | U | U | U | U | U | U | U | U | U | U | U |
| 11 | F | F | U | U | U | U | U | U | U | U | U | U | U | U |
| 12 | F | F | F | U | U | U | U | U | U | U | U | U | U | U |
| 13 | F | F | F | F | U | U | U | U | U | U | U | U | U | U |
| 14 | F | F | F | F | F | U | U | U | U | U | U | U | U | U |
| 15 | F | F | F | F | F | F | U | U | U | U | U | U | U | U |
| 16 | D | F | F | F | F | F | F | F | F | F | F | F | F | F |
| 17 | D | D | F | F | F | F | F | F | F | F | F | F | F | F |
| 18 | D | D | D | F | F | F | F | F | F | F | F | F | F | F |
| 19 | D | F | F | F | F | F | F | F | F | F | F | F | F | U |
| 20 | D | D | F | F | F | F | F | F | F | F | F | F | F | U |
| 21 | D | D | D | F | F | F | F | F | F | F | F | F | F | U |
| 22 | D | F | F | F | F | F | F | F | F | F | F | F | U | U |
| 23 | D | D | F | F | F | F | F | F | F | F | F | F | U | U |
| 24 | D | D | D | F | F | F | F | F | F | F | F | F | U | U |
| 25 | D | F | F | F | F | F | F | F | F | F | F | U | U | U |
| 26 | D | D | F | F | F | F | F | F | F | F | F | U | U | U |
| 27 | D | D | D | F | F | F | F | F | F | F | F | U | U | U |
| 28 | D | D | D | D | D | D | D | D | D | D | D | D | F | U |
| 29 | D | D | D | D | D | D | D | D | D | D | D | F | F | U |
| 30 | D | D | D | D | D | D | D | D | D | D | F | F | F | U |

FIG. 5A (PRIOR ART)

| Format | Symbol number in a slot | | | | | | | | | | | | | |
|---|---|---|---|---|---|---|---|---|---|---|---|---|---|---|
| | 0 | 1 | 2 | 3 | 4 | 5 | 6 | 7 | 8 | 9 | 10 | 11 | 12 | 13 |
| ... | ... | ... | ... | ... | ... | ... | ... | ... | ... | ... | ... | ... | ... | ... |
| 31 | D | D | D | D | D | D | D | D | D | D | D | F | U | U |
| 32 | D | D | D | D | D | D | D | D | D | D | F | F | U | U |
| 33 | D | D | D | D | D | D | D | D | D | F | F | F | U | U |
| 34 | D | F | U | U | U | U | U | U | U | U | U | U | U | U |
| 35 | D | D | F | U | U | U | U | U | U | U | U | U | U | U |
| 36 | D | D | D | F | U | U | U | U | U | U | U | U | U | U |
| 37 | D | F | F | U | U | U | U | U | U | U | U | U | U | U |
| 38 | D | D | F | F | U | U | U | U | U | U | U | U | U | U |
| 39 | D | D | D | F | F | U | U | U | U | U | U | U | U | U |
| 40 | D | F | F | F | U | U | U | U | U | U | U | U | U | U |
| 41 | D | D | F | F | F | U | U | U | U | U | U | U | U | U |
| 42 | D | D | D | F | F | F | U | U | U | U | U | U | U | U |
| 43 | D | D | D | D | D | D | D | D | D | F | F | F | F | U |
| 44 | D | D | D | D | D | D | F | F | F | F | F | F | U | U |
| 45 | D | D | D | D | D | D | F | F | U | U | U | U | U | U |
| 46 | D | D | D | D | D | F | U | D | D | D | D | D | F | U |
| 47 | D | D | F | U | U | U | U | D | D | F | U | U | U | U |
| 48 | D | F | U | U | U | U | U | D | F | U | U | U | U | U |
| 49 | D | D | D | D | F | F | U | D | D | D | D | F | F | U |
| 50 | D | D | F | F | U | U | U | D | D | F | F | U | U | U |
| 51 | D | F | F | U | U | U | U | D | F | F | U | U | U | U |
| 52 | D | F | F | F | F | F | U | D | F | F | F | F | F | U |
| 53 | D | D | F | F | F | F | U | D | D | F | F | F | F | U |
| 54 | F | F | F | F | F | F | F | D | D | D | D | D | D | D |
| 55 | D | D | F | F | F | U | U | U | D | D | D | D | D | D |
| 56 – 254 | Reserved | | | | | | | | | | | | | |
| 255 | UE determines the slot format for the slot based on tdd-UL-DL-ConfigurationCommon, tdd-UL-DL-ConfigurationCommon2, or tdd-UL-DL-ConfigDedicated and, if any, on detected DCI formats | | | | | | | | | | | | | |

FIG. 5B (PRIOR ART)

| $\mu$ | $\Delta f = 2^{\mu} \cdot 15 [\text{kHz}]$ | Cyclic prefix |
|---|---|---|
| 0 | 15 | Normal |
| 1 | 30 | Normal |
| 2 | 60 | Normal, Extended |
| 3 | 120 | Normal |
| 4 | 240 | Normal |

FIG. 6 (PRIOR ART)

| $\mu$ | $N^{slot}_{symb}$ | $N^{frame,\mu}_{slot}$ | $N^{subframe,\mu}_{slot}$ |
|---|---|---|---|
| 0 | 14 | 10 | 1 |
| 1 | 14 | 20 | 2 |
| 2 | 14 | 40 | 4 |
| 3 | 14 | 80 | 8 |
| 4 | 14 | 160 | 16 |

FIG. 7 (PRIOR ART)

METHOD AND APPARATUS FOR DETERMINING SLOT FORMAT IN A WIRELESS COMMUNICATION SYSTEM

CROSS-REFERENCE TO RELATED APPLICATIONS

The present Application claims the benefit of U.S. Provisional Patent Application Ser. No. 62/701,214 filed on Jul. 20, 2018, the entire disclosure of which is incorporated herein in its entirety by reference.

FIELD

This disclosure generally relates to wireless communication networks, and more particularly, to a method and apparatus for determining slot format in a wireless communication system.

BACKGROUND

With the rapid rise in demand for communication of large amounts of data to and from mobile communication devices, traditional mobile voice communication networks are evolving into networks that communicate with Internet Protocol (IP) data packets. Such IP data packet communication can provide users of mobile communication devices with voice over IP, multimedia, multicast and on-demand communication services.

An exemplary network structure is an Evolved Universal Terrestrial Radio Access Network (E-UTRAN). The E-UTRAN system can provide high data throughput in order to realize the above-noted voice over IP and multimedia services. A new radio technology for the next generation (e.g., 5G) is currently being discussed by the 3GPP standards organization. Accordingly, changes to the current body of 3GPP standard are currently being submitted and considered to evolve and finalize the 3GPP standard.

SUMMARY

A method and apparatus are disclosed from the perspective of a network. In one embodiment, the method includes the network configuring a DL (Downlink) BWP (Bandwidth Part) and an UL (Uplink) BWP in a first serving cell to a UE (User Equipment). The method also includes the network configuring a paired spectrum operation in the first serving cell to the UE. The method further includes the network transmitting a first DCI (Downlink Control Information) to the UE, wherein the first DCI comprises a slot format combination indicating one or more slot format values for the DL BWP and one or more slot format values for the UL BWP. In addition, the method includes the network prevents from setting an amount of slot format values in the slot format combination in the first DCI to be not divided by a first number, wherein the first number is associated with an absolute value of a difference of a first SCS (Subcarrier Spacing) configuration and a second SCS configuration.

BRIEF DESCRIPTION OF THE DRAWINGS

FIGS. 5A and 5B are a reproduction of Table 11.1.1-1 of 3GPP TS 38.213 V15.2.0.

FIG. 6 is a reproduction of Table 4.2-1 of 3GPP TS38.211 V15.2.0.

FIG. 7 is a reproduction of Table 4.3.2-1 of 3GPP TS38.211 V15.2.0.

DETAILED DESCRIPTION

The exemplary wireless communication systems and devices described below employ a wireless communication system, supporting a broadcast service. Wireless communication systems are widely deployed to provide various types of communication such as voice, data, and so on. These systems may be based on code division multiple access (CDMA), time division multiple access (TDMA), orthogonal frequency division multiple access (OFDMA), 3GPP LTE (Long Term Evolution) wireless access, 3GPP LTE-A or LTE-Advanced (Long Term Evolution Advanced), 3GPP2 UMB (Ultra Mobile Broadband), WiMax, 3GPP NR (New Radio), or some other modulation techniques.

In particular, the exemplary wireless communication systems devices described below may be designed to support one or more standards such as the standard offered by a consortium named "3rd Generation Partnership Project" referred to herein as 3GPP, including: TS 38.213 V15.2.0, "Physical layer procedures for control"; TS 38.211 V15.2.0, "Physical channels and modulation"; Final Report of 3GPP TSG RAN WG1 #AH_1801 v1.0.0 (Vancouver, Canada, 22-26 Jan. 2018); Final Report of 3GPP TSG RAN WG1 #92 v1.0.0 (Athens, Greece, 26 Feb.-2 Mar. 2018); Final Report of 3GPP TSG RAN WG1 #92bis v1.0.0 (Sanya, China, 16-20 Apr. 2018); Draft Report of 3GPP TSG RAN WG1 #93 v0.2.0 (Busan, South Korea, 21-25 May 2018); TS 38.331 V15.2.0, "Radio Resource Control (RRC) protocol specification"; and TS 38.212 V15.2.0, "Multiplexing and channel coding". The standards and documents listed above are hereby expressly incorporated by reference in their entirety.

Figure 1:
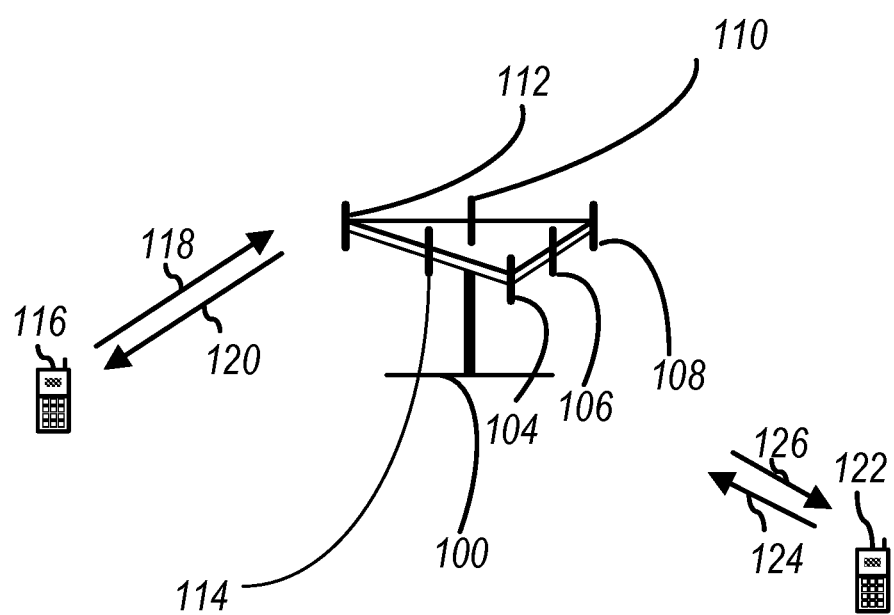
FIG. 1 shows a diagram of a wireless communication system according to one exemplary embodiment.

FIG. 1 shows a multiple access wireless communication system according to one embodiment of the invention. An access network 100 (AN) includes multiple antenna groups, one including 104 and 106, another including 108 and 110, and an additional including 112 and 114. In FIG. 1, only two antennas are shown for each antenna group, however, more or fewer antennas may be utilized for each antenna group. Access terminal 116 (AT) is in communication with antennas 112 and 114, where antennas 112 and 114 transmit information to access terminal 116 over forward link 120 and receive information from access terminal 116 over reverse link 118. Access terminal (AT) 122 is in communication with antennas 106 and 108, where antennas 106 and 108 transmit information to access terminal (AT) 122 over forward link 126 and receive information from access terminal (AT) 122 over reverse link 124. In a FDD system, communication links 118, 120, 124 and 126 may use different frequency for communication. For example, forward link 120 may use a different frequency then that used by reverse link 118.

Each group of antennas and/or the area in which they are designed to communicate is often referred to as a sector of the access network. In the embodiment, antenna groups each are designed to communicate to access terminals in a sector of the areas covered by access network 100.

In communication over forward links 120 and 126, the transmitting antennas of access network 100 may utilize beamforming in order to improve the signal-to-noise ratio of forward links for the different access terminals 116 and 122. Also, an access network using beamforming to transmit to access terminals scattered randomly through its coverage causes less interference to access terminals in neighboring cells than an access network transmitting through a single antenna to all its access terminals.

An access network (AN) may be a fixed station or base station used for communicating with the terminals and may also be referred to as an access point, a Node B, a base station, an enhanced base station, an evolved Node B (eNB), a network node, a network, or some other terminology. An access terminal (AT) may also be called user equipment (UE), a wireless communication device, terminal, access terminal or some other terminology.

Figure 2:
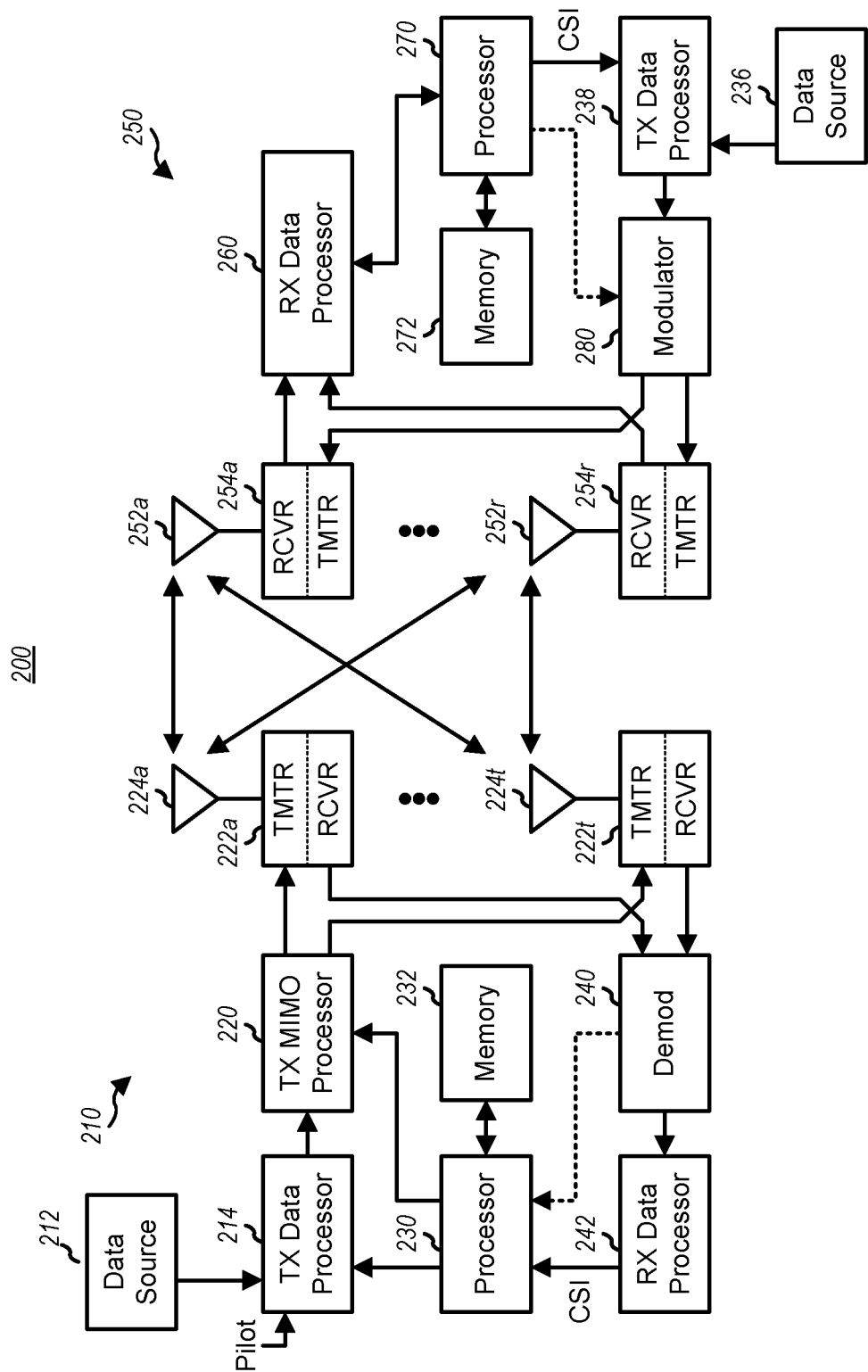
FIG. 2 is a block diagram of a transmitter system (also known as access network) and a receiver system (also known as user equipment or UE) according to one exemplary embodiment.

FIG. 2 is a simplified block diagram of an embodiment of a transmitter system 210 (also known as the access network) and a receiver system 250 (also known as access terminal (AT) or user equipment (UE)) in a MIMO system 200. At the transmitter system 210, traffic data for a number of data streams is provided from a data source 212 to a transmit (TX) data processor 214.

In one embodiment, each data stream is transmitted over a respective transmit antenna. TX data processor 214 formats, codes, and interleaves the traffic data for each data stream based on a particular coding scheme selected for that data stream to provide coded data.

The coded data for each data stream may be multiplexed with pilot data using OFDM techniques. The pilot data is typically a known data pattern that is processed in a known manner and may be used at the receiver system to estimate the channel response. The multiplexed pilot and coded data for each data stream is then modulated (i.e., symbol mapped) based on a particular modulation scheme (e.g., BPSK, QPSK, M-PSK, or M-QAM) selected for that data stream to provide modulation symbols. The data rate, coding, and modulation for each data stream may be determined by instructions performed by processor 230.

The modulation symbols for all data streams are then provided to a TX MIMO processor 220, which may further process the modulation symbols (e.g., for OFDM). TX MIMO processor 220 then provides $N_T$ modulation symbol streams to $N_T$ transmitters (TMTR) 222a through 222t. In certain embodiments, TX MIMO processor 220 applies beamforming weights to the symbols of the data streams and to the antenna from which the symbol is being transmitted.

Each transmitter 222 receives and processes a respective symbol stream to provide one or more analog signals, and further conditions (e.g., amplifies, filters, and upconverts) the analog signals to provide a modulated signal suitable for transmission over the MIMO channel. $N_T$ modulated signals from transmitters 222a through 222t are then transmitted from $N_T$ antennas 224a through 224t, respectively.

At receiver system 250, the transmitted modulated signals are received by $N_R$ antennas 252a through 252r and the received signal from each antenna 252 is provided to a respective receiver (RCVR) 254a through 254r. Each receiver 254 conditions (e.g., filters, amplifies, and downconverts) a respective received signal, digitizes the conditioned signal to provide samples, and further processes the samples to provide a corresponding "received" symbol stream.

An RX data processor 260 then receives and processes the $N_R$ received symbol streams from $N_R$ receivers 254 based on a particular receiver processing technique to provide $N_T$ "detected" symbol streams. The RX data processor 260 then demodulates, deinterleaves, and decodes each detected symbol stream to recover the traffic data for the data stream. The processing by RX data processor 260 is complementary to that performed by TX MIMO processor 220 and TX data processor 214 at transmitter system 210.

A processor 270 periodically determines which pre-coding matrix to use (discussed below). Processor 270 formulates a reverse link message comprising a matrix index portion and a rank value portion.

The reverse link message may comprise various types of information regarding the communication link and/or the received data stream. The reverse link message is then processed by a TX data processor 238, which also receives traffic data for a number of data streams from a data source 236, modulated by a modulator 280, conditioned by transmitters 254a through 254r, and transmitted back to transmitter system 210.

At transmitter system 210, the modulated signals from receiver system 250 are received by antennas 224, conditioned by receivers 222, demodulated by a demodulator 240, and processed by a RX data processor 242 to extract the reserve link message transmitted by the receiver system 250. Processor 230 then determines which pre-coding matrix to use for determining the beamforming weights then processes the extracted message.

Figure 3:
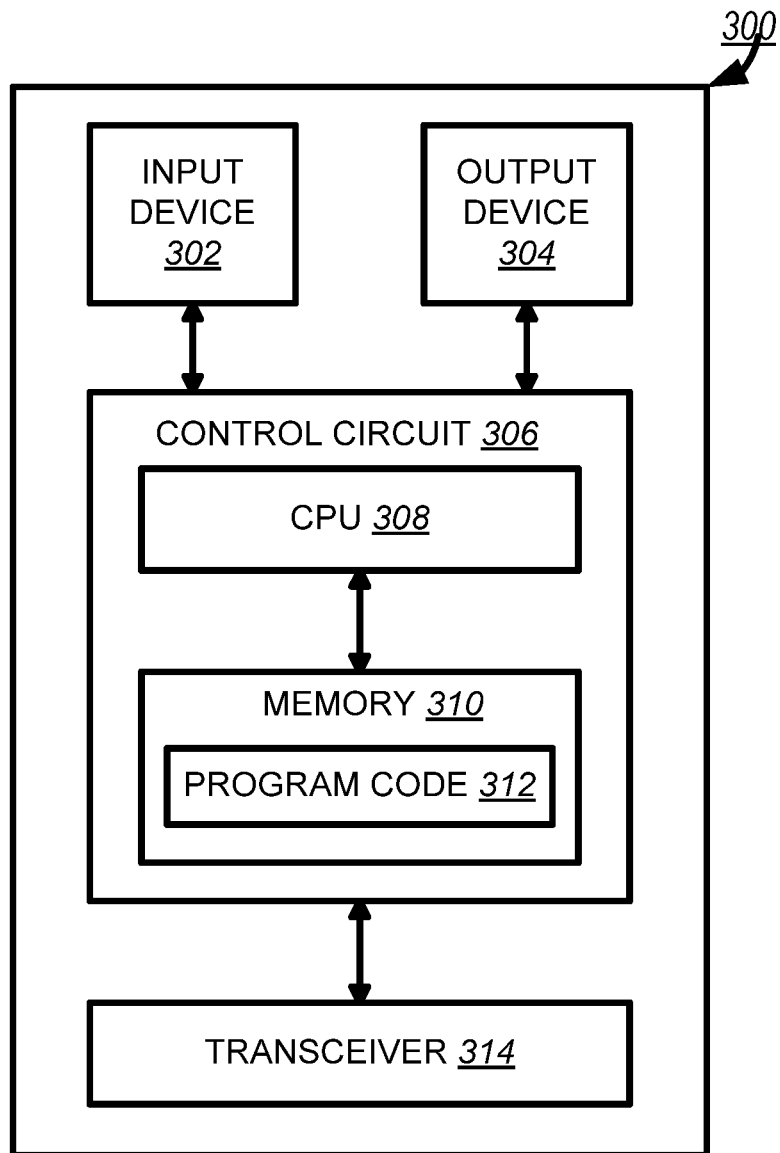
FIG. 3 is a functional block diagram of a communication system according to one exemplary embodiment.

Turning to FIG. 3, this figure shows an alternative simplified functional block diagram of a communication device according to one embodiment of the invention. As shown in FIG. 3, the communication device 300 in a wireless communication system can be utilized for realizing the UEs (or ATs) 116 and 122 in FIG. 1 or the base station (or AN) 100 in FIG. 1, and the wireless communications system is preferably the NR system. The communication device 300 may include an input device 302, an output device 304, a control circuit 306, a central processing unit (CPU) 308, a memory 310, a program code 312, and a transceiver 314. The control circuit 306 executes the program code 312 in the memory 310 through the CPU 308, thereby controlling an operation of the communications device 300. The communications device 300 can receive signals input by a user through the input device 302, such as a keyboard or keypad, and can output images and sounds through the output device 304, such as a monitor or speakers. The transceiver 314 is used to receive and transmit wireless signals, delivering received signals to the control circuit 306, and outputting signals generated by the control circuit 306 wirelessly. The communication device 300 in a wireless communication system can also be utilized for realizing the AN 100 in FIG. 1.

Figure 4:
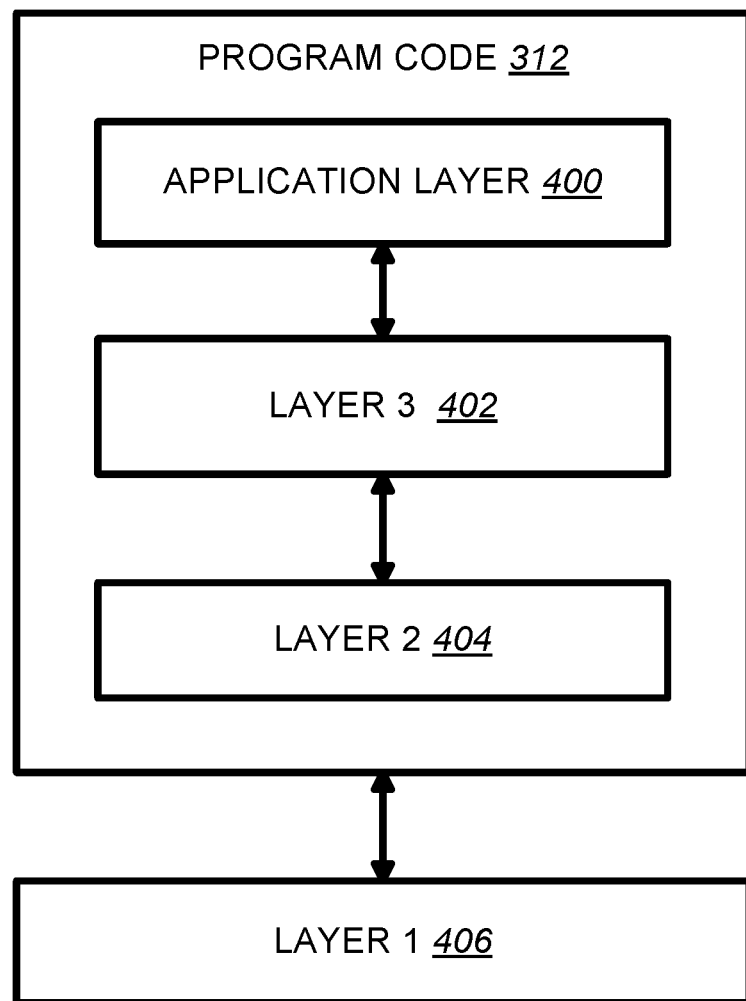
FIG. 4 is a functional block diagram of the program code of FIG. 3 according to one exemplary embodiment.

FIG. 4 is a simplified block diagram of the program code 312 shown in FIG. 3 in accordance with one embodiment of the invention. In this embodiment, the program code 312 includes an application layer 400, a Layer 3 portion 402, and a Layer 2 portion 404, and is coupled to a Layer 1 portion 406. The Layer 3 portion 402 generally performs radio resource control. The Layer 2 portion 404 generally performs link control. The Layer 1 portion 406 generally performs physical connections.

3GPP TS 38.213 describes the following procedures for PDCCH monitoring, slot format, frame structure, bandwidth part (BWP), and some abbreviation. A slot format value could be 0 to 255 indicating an entry of Table 11.1.1-1 of 3GPP TS 38.213 V15.2.0 (reproduced as FIG. 5). A slot format value could indicate a slot format of a slot with normal cyclic prefix.

10.1 UE Procedure for Determining Physical Downlink Control Channel Assignment A set of PDCCH candidates for a UE to monitor is defined in terms of PDCCH search space sets. A search space set can be a common search space set or a UE-specific search space set. A UE monitors PDCCH candidates in one or more of the following search spaces sets

- a Type0-PDCCH common search space set configured by searchSpaceZero in MasterinformationBlock or by searchSpaceSIB1 in PDCCH-ConfigCommon for a DCI format with CRC scrambled by a SI-RNTI on a primary cell;
- a Type0A-PDCCH common search space set configured by searchSpace-OSI in PDCCH-ConfigCommon for a DCI format with CRC scrambled by a SI-RNTI on a primary cell;
- a Type1-PDCCH common search space set configured by ra-SearchSpace in PDCCH-ConfigCommon for a DCI format with CRC scrambled by a RA-RNTI, or a TC-RNTI on a primary cell;
- a Type2-PDCCH common search space set configured by pagingSearchSpace in PDCCH-ConfigCommon for a DCI format with CRC scrambled by a P-RNTI on a primary cell;
- a Type3-PDCCH common search space set configured by SearchSpace in PDCCH-Config with searchSpaceType=common for DCI formats with CRC scrambled by INT-RNTI, or SFI-RNTI, or TPC-PUSCH-RNTI, or TPC-PUCCH-RNTI, or TPC-SRS-RNTI and, only for the primary cell, C-RNTI, or CS-RNTI(s); and
- a UE-specific search space set configured by SearchSpace in PDCCH-Config with searchSpaceType=ue-Specific for DCI formats with CRC scrambled by C-RNTI, or CS-RNTI(s).

For each DL BWP configured to a UE in a serving cell, the UE is provided by higher layers with s≤10 search space sets where, for each search space set from the s search space sets, the UE is provided the following by higher layer parameter SearchSpace:

- a search space set index $s$ $0 \leq s < 40$, by higher layer parameter searchSpaceId;
- an association between the search space set s and a control resource set p by higher layer parameter contro/ResourceSetid;
- a PDCCH monitoring periodicity of $k_{p,s}$ slots and a PDCCH monitoring offset of $o_{p,s}$ slots, by higher layer parameter monitoringSlotPeriodicityAndOffset;
- a PDCCH monitoring pattern within a slot, indicating first symbol(s) of the control resource set within a slot for PDCCH monitoring, by higher layer parameter monitoringSymbolsWithinSlot;
- a number of PDCCH candidates $M_{p,s}^{(L)}$ per CCE aggregation level L by higher layer parameters aggregationLevel1, aggregationLevel2, aggregationLevel4, aggregationLevel8, and aggregationLevel16, for CCE aggregation level 1, CCE aggregation level 2, CCE aggregation level 4, CCE aggregation level 8, and CCE aggregation level 16, respectively;
- an indication that search space set s is either a common search space set or a UE-specific search space set by higher layer parameter searchSpaceType;
- if search space set s is a common search space set,
  - an indication by higher layer parameter dci-Format0-0-AndFormat1-0 to monitor PDCCH candidates for DCI format 0_0 and DCI format 1_0 with CRC scrambled by a C-RNTI or a CS-RNTI (if configured), RA-RNTI, TC-RNTI, P-RNTI, SI-RNTI;
  - an indication by higher layer parameter dci-Format2-0 to monitor one or two PDCCH candidates for DCI format 2_0 and a corresponding CCE aggregation level;
  - an indication by higher layer parameter dci-Format2-1 to monitor PDCCH candidates for DCI format 2_1;
  - an indication by higher layer parameter dci-Format2-2 to monitor PDCCH candidates for DCI format 2_2;
  - an indication by higher layer parameter dci-Format2-3 to monitor PDCCH candidates for DCI format 2_3;
- if search space set s is a UE-specific search space set,
  - an indication by higher layer parameter dci-Formats to monitor PDCCH candidate either for DCI format 0_0 and DCI format 1_0, or for DCI format 0_1 and DCI format 1_1.

11 UE-Group Common Signalling

11.1 Slot Configuration

A slot format includes downlink symbols, uplink symbols, and flexible symbols.

11.1.1 UE Procedure for Determining Slot Format

This subclause applies for a serving cell that is included in a set of serving cells configured to a UE by higher layer parameters slotFormatCombToAddModList and slotFormatCombToReleaseList.

If a UE is configured by higher layers with parameter SlotFormatIndicator, the UE is provided with a SFI-RNTI by higher layer parameter sfi-RNTI and with a payload size of DCI format 2_0 by higher layer parameter dci-PayloadSize. The UE is also provided in one or more serving cells with a configuration for a search space set s and a corresponding control resource set p for monitoring $M_{p,s}^{(L_{SFI})}$ PDCCH candidates for DCI format 2_0 with a CCE aggregation level of $L_{SFI}$ CCEs as described in Subclause 10.1. The $M_{p,s}^{(L_{SFI})}$ PDCCH candidates are the first $M_{p,s}^{(L_{SFI})}$ PDCCH candidates for CCE aggregation level $L_{SFI}$ for search space set s in control resource set p.

For each serving cell in the set of serving cells, the UE can be provided:
- an identity of the serving cell by higher layer parameter servingCellId
- a location of a SFI-index field in DCI format 2_0 by higher layer parameter positionInDCI
- a set of slot format combinations by higher layer parameter slotFormatCombinations, where each slot format combination in the set of slot format combinations includes
  - one or more slot formats indicated by a respective higher layer parameter slotFormats for the slot format combination, and
  - a mapping for the slot format combination provided by slotFormats to a corresponding SFI-index field value in DCI format 2_0 provided by higher layer parameter slotFormatCombinationid
- for unpaired spectrum operation, a reference subcarrier spacing $\mu_{SFI}$ by higher layer parameter subcarrierSpacing and, when a supplementary UL carrier is configured for the serving cell, a reference subcarrier spacing $\mu_{SFI,SUL}$ by higher layer parameter subcarrierSpacing2 for the supplementary UL carrier
- for paired spectrum operation, a reference subcarrier spacing $\mu_{SFI,DL}$ for a DL BWP by higher layer parameter subcarrierSpacing and a reference subcarrier spacing $\mu_{SFI,UL}$ for an UL BWP by higher layer parameter subcarrierSpacing2

A SFI-index field value in a DCI format 2_0 indicates to a UE a slot format for each slot in a number of slots for each DL BWP or each UL BWP starting from a slot where the UE detects the DCI format 2_0. The number of slots is equal to or larger than a PDCCH monitoring periodicity for DCI format 2_0. The SFI-index field includes $\log_2$(maxSFIindex) bits where maxSFIindex is the maximum value of the values provided by corresponding higher layer parameters slotFormatCombinationId. A slot format is identified by a corresponding format index as provided in Table 11.1.1-1 where 'D' denotes a downlink symbol, 'U' denotes an uplink symbol, and 'F' denotes a flexible symbol.

If a PDCCH monitoring periodicity for DCI format 2_0, provided to a UE for the search space set s by higher layer parameter monitoringSlotPeriodicityAndOffset, is smaller than a duration of a slot format combination the UE obtains at a PDCCH monitoring occasion for DCI format 2_0 by a corresponding SFI-index field value, and the UE detects more than one DCI formats 2_0 indicating a slot format for a slot, the UE expects each of the more than one DCI formats 2_0 to indicate a same format for the slot.

A UE does not expect to be configured to monitor PDCCH for DCI format 2_0 on a second serving cell that uses larger subcarrier spacing than the serving cell.

Table 11.1.1-1 of 3GPP TS 38.213 V15.2.0,
Entitled "Slot Formats for Normal Cyclic Prefix",
is Reproduced as FIGS. 5A and 5B For unpaired spectrum operation for a UE on a serving cell, the UE is provided by higher layer parameter subcarrierSpacing a reference subcarrier spacing configuration of $\mu_{SFI}$ for each slot format in a combination of slot formats indicated by a SFI-index field value in DCI format 2_0. The UE expects that for a reference subcarrier spacing configuration of $\mu_{SFI}$ and for an active DL BWP and UL BWP pair with subcarrier spacing configuration of $\mu$, it is $\mu \geq \mu_{SFI}$. Each slot format in the combination of slot formats indicated by the SFI-index field value in DCI format 2_0 is applicable to $2^{(\mu-\mu_{SFI})}$ consecutive slots in the active DL BWP and UL BWP pair where the first slot starts at a same time as a first slot for the reference subcarrier spacing configuration of $\mu_{SFI}$ and each downlink or flexible or uplink symbol for the reference subcarrier spacing configuration of $\mu_{SFI}$ corresponds to $2^{(\mu-\mu_{SFI})}$ consecutive downlink or flexible or uplink symbols for the subcarrier spacing configuration $\mu$.

For paired spectrum operation for a UE on a serving cell, the SFI-index field in DCI format 2_0 indicates a combination of slot formats that includes a combination of slot formats for a reference DL BWP and a combination of slot formats for a reference UL BWP of the serving cell. The UE is provided by higher layer parameter subcarrierSpacing a reference subcarrier spacing configuration of $\mu_{SFI,DL}$ for the combination of slot formats indicated by the SFI-index field value in DCI format 2_0 for the reference DL BWP of the serving cell. The UE is provided by higher layer parameter subcarrierSpacing2 a reference subcarrier spacing configuration of $\mu_{SFI,UL}$ for the combination of slot formats indicated by the SFI-index field value in DCI format 2_0 for the reference UL BWP of the serving cell. If $\mu_{SFI,DL} \geq \mu_{SFI,UL}$ and for each $2^{(\mu_{SFI,DL}-\mu_{SFI,UL})}+1$ values provided by a value of higher layer parameter slotFormats, where the value of slotFormats is determined by a value of slotFormatCombinationid in slotFormatCombination and the value of slotFormatCombinationid is set by the value of the SFI-index field value in DCI format 2_0, the first $2^{(\mu_{SFI,DL}-\mu_{SFI,UL})}$ values for the combination of slot formats are applicable to the reference DL BWP and the next value is applicable to the reference UL BWP. If $\mu_{SFI,DL} < \mu_{SFI,UL}$ and for each $2^{(\mu_{SFI,UL}-\mu_{SFI,DL})}+1$ values provided by higher layer parameter slotFormats, the first value for the combination of slot formats is applicable to the reference DL BWP and the next $2^{(\mu_{SFI,UL}-\mu_{SFI,DL})}$ values are applicable to the reference UL BWP.

The UE is provided with a reference subcarrier spacing configuration of $\mu_{SFI,DL}$ so that for an active DL BWP with subcarrier spacing configuration of $\mu_{DL}$, it is $\mu_{DL} \geq \mu_{SFI,DL}$. The UE is provided with a reference subcarrier spacing configuration of $\mu_{SFI,UL}$ so that for an active UL BWP with subcarrier spacing configuration of $\mu_{UL}$, it is $\mu_{UL} \geq \mu_{SFI,UL}$. Each slot format for a combination of slot formats indicated by the SFI-index field value in DCI format 2_0 for the reference DL BWP, by indicating a value for slotFormatCombinationid that is mapped to a value of slotFormats in slotFormatCombination, is applicable to $2^{(\mu_{DL}-\mu_{SFI,DL})}$ consecutive slots for the active DL BWP where the first slot starts at a same time as a first slot in the reference DL BWP and each downlink or flexible symbol for the reference subcarrier spacing configuration of $\mu_{SFI,DL}$ corresponds to $2^{(\mu_{DL}-\mu_{SFI,DL})}$ consecutive downlink or flexible symbols for the subcarrier spacing configuration $\mu_{DL}$. Each slot format for the combination of slot formats for the reference UL BWP is applicable to $2^{(\mu_{UL}-\mu_{SFI,UL})}$ consecutive slots for the active UL BWP where the first slot starts at a same time as a first slot in the reference UL BWP and each uplink or flexible symbol for the reference subcarrier spacing configuration of $\mu_{SFI,UL}$ corresponds to $2^{(\mu_{UL}-\mu_{SFI,UL})}$ consecutive uplink or flexible symbols for the subcarrier spacing configuration $\mu_{UL}$. For unpaired spectrum operation with a second UL carrier for a UE on a serving cell, the SFI-index field value in DCI format 2_0 indicates a combination of slot formats that includes a combination of slot formats for a reference first UL carrier of the serving cell and a combination of slot formats for a reference second UL carrier of the serving cell.

The UE is provided by higher layer parameter subcarrier-Spacing a reference subcarrier spacing configuration of $\mu_{SFI}$ for the combination of slot formats indicated by the SFI-index field in DCI format 2_0 for the reference first UL carrier of the serving cell. The UE is provided by higher layer parameter subcarrierSpacing2 a reference subcarrier spacing configuration of $\mu_{SFI,SUL}$ for the combination of slot formats indicated by the SFI-index field value in DCI format 2_0 for the reference second UL carrier of the serving cell. For each $2^{(\mu_{SFI}-\mu_{SFI,SUL})}+1$ values of higher layer parameter slotFormats, the first $2^{(\mu_{SFI}-\mu_{SFI,SUL})}$ values for the combination of slot formats are applicable to the reference first UL carrier and the next value is applicable to the reference second UL carrier.

The UE expects to be provided with a reference subcarrier spacing configuration of $\mu_{SFI,SUL}$ so that for an active UL BWP in the second UL carrier with subcarrier spacing configuration of $\mu_{SUL}$, it is $\mu_{SUL} \geq \mu_{SFI,SUL}$. Each slot format for a combination of slot formats indicated by the SFI-index field in DCI format 2_0 for the reference first UL carrier is applicable to $2^{(\mu-\mu_{SFI})}$ consecutive slots for the active DL BWP and UL BWP pair in the first UL carrier where the first slot starts at a same time as a first slot in the reference first UL carrier. Each slot format for the combination of slot formats for the reference second UL carrier is applicable to $2^{(\mu_{SUL}-\mu_{SFI,SUL})}$ consecutive slots for the active UL BWP in the second UL carrier where the first slot starts at a same time as a first slot in the reference second UL carrier.

If a BWP in the serving cell is configured with $\mu=2$ and with extended CP, the UE expects $\mu_{SFI}=1$, or $\mu_{SFI}=2$. A format for a slot with extended CP is determined from a format for a slot with normal CP. A UE determines an extended CP symbol to be a downlink/uplink/flexible symbol if the overlapping normal CP symbols that are downlink/uplink/flexible symbols, respectively. A UE determines an extended CP symbol to be a flexible symbol if one of the overlapping normal CP symbols is flexible. A UE determines an extended CP symbol to be a flexible symbol if the pair of the overlapping normal CP symbols includes a downlink and an uplink symbol.

A reference subcarrier spacing configurations of $\mu_{SFI}$, or $\mu_{SFI,DL}$, or $\mu_{SFI,UL}$, or $\mu_{SFI,SUL}$ is either 0, or 1, or 2 for frequency range 1 and is either 2 or 3 for frequency range 2.

12 Bandwidth Part Operation

A UE configured for operation in bandwidth parts (BWPs) of a serving cell, is configured by higher layers for the serving cell a set of at most four bandwidth parts (BWPs) for receptions by the UE (DL BWP set) in a DL bandwidth by parameter BWP-Downlink and a set of at most four BWPs for transmissions by the UE (UL BWP set) in an UL bandwidth by parameter BWP-Uplink for the serving cell.

An initial active DL BWP is defined by a location and number of contiguous PRBs, a subcarrier spacing, and a cyclic prefix, for the control resource set for Type0-PDCCH common search space. For operation on the primary cell or on a secondary cell, a UE is provided an initial active UL BWP by higher layer parameter initialuplinkBWP. If the UE is configured with a supplementary carrier, the UE can be provided an initial UL BWP on the supplementary carrier by higher layer parameter initialUplinkBWP in supplementaryUplink.

If a UE has dedicated BWP configuration, the UE can be provided by higher layer parameter firstActiveDownlinkBWP-Id a first active DL BWP for receptions by and higher layer parameter firstActiveUplinkBWP-Id a first active UL BWP for transmissions on the primary cell.

For each DL BWP or UL BWP in a set of DL BWPs or UL BWPs, respectively, the UE is configured the following parameters for the serving cell as defined in [4, TS 38.211] or [6, TS 38.214]:
  a subcarrier spacing provided by higher layer parameter subcarrierSpacing;
  a cyclic prefix provided by higher layer parameter cyclicPrefix;
  a first PRB and a number of contiguous PRBs indicated by higher layer parameter locationAndBandwidth that is interpreted as RIV according to [4, TS 38.214], setting $N_{BWP}^{size}=275$, and the first PRB is a PRB offset relative to the PRB indicated by higher layer parameters offsetToCarrier and subcarrierSpacing;
  an index in the set of DL BWPs or UL BWPs by respective higher layer parameter bwp-Id;
  a set of BWP-common and a set of BWP-dedicated parameters by higher layer parameters bwp-Common and bwp-Dedicated [12, TS 38.331]

For unpaired spectrum operation, a DL BWP from the set of configured DL BWPs with index provided by higher layer parameter bwp-Id for the DL BWP is linked with an UL BWP from the set of configured UL BWPs with index provided by higher layer parameter bwp-Id for the UL BWP when the DL BWP index and the UL BWP index are equal. For unpaired spectrum operation, a UE does not expect to receive a configuration where the center frequency for a DL BWP is different than the center frequency for an UL BWP when the bwp-Id of the DL BWP is equal to the bwp-Id of the UL BWP.

3GPP TS 38.211 describes frame structure as follows:

4 Frame Structure and Physical Resources 4.1 General

Throughout this specification, unless otherwise noted, the size of various fields in the time domain is expressed in time units $T_c=1/(\Delta f_{max} \cdot N_f)$ where $\Delta f_{max}=480 \cdot 10^3$ Hz and $N_f=4096$. The constant $\kappa=T_s/T_c=64$ where $T_s=1/(\Delta f_{ref} \cdot N_{f,ref})$, $\Delta f_{ref}=15 \cdot 10^3$ Hz and $N_{f,ref}=2048$.

4.2 Numerologies

Multiple OFDM numerologies are supported as given by Table 4.2-1 where $\mu$ and the cyclic prefix for a bandwidth part are obtained from the higher-layer parameter subcarrierSpacing and cyclicPrefix, respectively.

[Table 4.2-1 of 3GPP T538.211 V15.2.0, entitled "Supported transmission numerologies", is reproduced as FIG. 6]

4.3 Frame Structure 4.3.1 Frames and Subframes

Downlink and uplink transmissions are organized into frames with $T_f=(\Delta f_{max} N_f/100) \cdot T_c=10$ ms duration, each consisting of ten subframes of $T_{sf}=(\Delta f_{max} N_f/1000) \cdot T_c=1$ ms duration. The number of consecutive OFDM symbols per subframe is $N_{symb}^{subframe,\mu}=N_{symb}^{slot} N_{slot}^{subframe,\mu}$. Each frame is divided into two equally-sized half-frames of five subframes each with half-frame 0 consisting of subframes 0-4 and half-frame 1 consisting of subframes 5-9.

4.3.2 Slots

For subcarrier spacing configuration µ, slots are numbered $n_s^\mu \in \{0, \ldots, N_{slot}^{subframe,\mu}-1\}$ in increasing order within a subframe and $n_{s,f}^\mu \in \{0, \ldots, N_{slot}^{frame,\mu}-1\}$ in increasing order within a frame. There are $N_{symb}^{slot}$ consecutive OFDM symbols in a slot where $N_{symb}^{slot}$ depends on the cyclic prefix as given by Tables 4.3.2-1 and 4.3.2-2. The start of slot $n_s^\mu$ in a subframe is aligned in time with the start of OFDM symbol $n_s^\mu N_{symb}^{slot}$ in the same subframe.

OFDM symbols in a slot can be classified as 'downlink', 'flexible', or 'uplink'. Signaling of slot formats is described in subclause 11.1 of [5, TS 38.213].

In a slot in a downlink frame, the UE shall assume that downlink transmissions only occur in 'downlink' or 'flexible' symbols.

In a slot in an uplink frame, the UE shall only transmit in 'uplink' or 'flexible' symbols.

[Table 4.3.2-1 of 3GPP TS38.211 V15.2.0, entitled "Number of OFDM symbols per slot, slots per frame, and slots per subframe for normal cyclic prefix", is reproduced as FIG. 7]

The Final Report of 3GPP TSG RAN WG1 #AH_1801 v1.0.0 includes the following agreements:

Agreements:
Explicitly add reference SCS field in UE-specific SFI table configuration
  The UE does not expect the reference SCS to have larger SCS than any of the configured BWP the GC-PDCCH is configured for
  The reference SCS is UE-specifically configured per cell (new RRC parameter)
  For FR1: 15 kHz/30 kHz/60 kHz
  For FR2: 60 kHz/120 kHz Agreements: Confirm the following working assumption with updates:
For FDD SFI support, use multi-slot SFI configuration to achieve FDD SFI support
  RRC configures reference SCS for DL BWP and reference SCS for UL BWP (new RRC parameters)
  The SFI for one FDD slot is configured with multiple values when configuring the slot format for one slot in each entry in the UE-specific SFI table
    If the DL and UL reference SCSs are the same, for each pair of values in the configuration for an SFI entry, even location value is for DL BWP, and odd location value is for UL BWP
    If DL reference SCS is higher than the UL reference SCS, K is the SCS ratio between DL reference SCS and UL reference SCS (K>1), use a (K+1) values for the SFI configuration for each reference UL slot (or K DL reference slots), with the first K values in the (K+1) values being the SFI for the K DL reference slots, and the last value for the one UL reference slot
    If DL reference SCS is lower than the UL reference SCS, K is the SCS ratio between UL reference SCS and DL reference SCS (K>1), use a (K+1) values for the SFI configuration for each DL reference slot (or K UL reference slots), with the first value in the (K+1) values being the SFI for the DL reference slot, and the last K values for the K UL reference slots Same mechanism can be applied to SUL case
  For TDD non-SUL carrier
    RRC configures reference SCS for non-SUL carrier and reference SCS for SUL carrier (new RRC parameter)
    K is the SCS ratio between non-SUL reference SCS and SUL reference SCS (K>=1), use a (K+1) values for the SFI configuration for each SUL reference slot (or K non-SUL reference slots), with the first K values in the (K+1) values being the SFI for the K reference slots in non-SUL carrier, and the last value for the one reference slot of the SUL carrier Agreement:
UE-specific SFI table configuration (including reference SCS(s)) is per cell The Final Report of 3GPP TSG RAN WG1 #92bis v1.0.0 includes the following agreement related to frame structure and/or SFI (Slot Format Indication):

Agreement:
Limit the size of the UE-specific SFI table to a max total of 512 values across all entries in Rel 15.

The Draft Report of 3GPP TSG RAN WG1 #93 v0.2.0 includes the following agreements related to frame structure and/or SFI (Slot Format Indication):

Agreement:
When configure the UE-specific SFI table, each entry at least explicitly specifies the slot formats for the slots equals to the configured SFI monitoring periodicity.

3GPP TS 38.331 describes the information element (IE) related to slot format as follows:

BWP

The BWP IE is used to configure a bandwidth part as defined in 38.211, section 4.2.2.

For each serving cell the network configures at least an initial bandwidth part comprising of at least a downlink bandwidth part and one (if the serving cell is configured with an uplink) or two (if using supplementary uplink (SUL)) uplink bandwidth parts. Furthermore, the network may configure additional uplink and downlink bandwidth parts for a serving cell.

The bandwidth part configuration is split into uplink and downlink parameters and into common and dedicated parameters. Common parameters (in BWP-UplinkCommon and BWP-DownlinkCommon) are "cell specific" and the network ensures the necessary alignment with corresponding parameters of other UEs. The common parameters of the initial bandwidth part of the PCell are also provided via system information. For all other serving cells, the network provides the common parameters via dedicated signalling.

| BWP information element |
|---|

```
-- ASN1START
-- TAG-BANDWIDTH-PART-START
BWP ::=                    SEQUENCE {
  locationAndBandwidth     INTEGER (0..37949),
  subcarrierSpacing        SubcarrierSpacing,
  cyclicPrefix             ENUMERATED { extended }        OPTIONAL       -- Need R
}
BWP-Uplink ::=             SEQUEUE {
  bwp-Id                   BWP-Id,
  bwp-Common               BWP-UplinkCommon               OPTIONAL,      -- Need M
  bwp-Dedicated            BWP-UplinkDedicated            OPTIONAL,      -- Need M
  ...
}
BWP-UplinkCommon ::=       SEQUENCE {
  genericParameters        BWP,
  rach-ConfigCommon        SetupRelease { RACH-ConfigCommon }   OPTIONAL,   -- Need M
  pusch-ConfigCommon       SetupRelease { PUSCH-ConfigCommon }  OPTIONAL,   -- Need M
  pucch-ConfigCommon       SetupRelease { PUCCH-ConfigCommon }  OPTIONAL,   -- Need M
  ...
}
BWP-UplinkDedicated ::=    SEQUENCE {
  pucch-Config             SetupRelease { PUCCH-Config }        OPTIONAL,   -- Need M
  pusch-Config             SetupRelease { PUSCH-Config }        OPTIONAL,   -- Cond SetupOnly
  configuredGrantConfig    SetupRelease { ConfiguredGrantConfig }   OPTIONAL,   -- Need M
  srs-Config               SetupRelease { SRS-Config }          OPTIONAL,   -- Need M
  beamFailureRecoveryConfig   SetupRelease { BeamFailureRecoveryConfig }    OPTIONAL, --
Cond SpCellOnly
  ...
}
BWP-Downlink ::=           SEQUENCE {
  bwp-Id                   BWP-Id,
  bwp-Common               BWP-DownlinkCommon             OPTIONAL,      -- Need M
  bwp-Dedicated            BWP-DownlinkDedicated          OPTIONAL,      -- Need M
  ...
}
BWP-DownlinkCommon ::=     SEQUENCE {
  genericParameters        BWP,
  pdcch-ConfigCommon       SetupRelease { PDCCH-ConfigCommon }  OPTIONAL,   -- Need M
  pdsch-ConfigCommon       SetupRelease { PDSCH-ConfigCommon }  OPTIONAL,   -- Need M
  ...
}
BWP-DownlinkDedicated ::=  SEQUENCE {
  pdcch-Config             SetupRelease { PDCCH-Config }        OPTIONAL,   -- Need M
  pdsch-Config             SetupRelease { PDSCH-Config }        OPTIONAL,   -- Need M
  sps-Config               SetupRelease { SPS-Config }          OPTIONAL,   -- Need M
  radioLinkMonitoringConfig   SetupRelease { RadioLinkMonitoringConfig }   OPTIONAL, --
Need M
  ...
}
-- TAG-BANDWIDTH-PART-STOP
-- ASN1STOP
```

| BWP field descriptions |
| --- |
| subcarrierSpacing |
| Subcarrier spacing to be used in this BWP for all channels and reference signals unless explicitly configured elsewhere. Corresponds to subcarrier spacing according to 38.211, Table 4.2-1. The value kHz15 corresponds to $\mu = 0$, kHz30 to $\mu = 1$, and so on. Only the values 15, 30, or 60 kHz (<6 GHz), and 60 or 120 kHz (>6 GHz) are applicable. |

| BWP-Downlink field descriptions |
| --- |
| bwp-Id |
| An identifier for this bandwidth part. Other parts of the RRC configuration use the BWP-Id to associate themselves with a particular bandwidth part. The BWP ID = 0 is always associated with the initial BWP and may hence not be used here (in other bandwidth parts).<br>The NW may trigger the UE to swtich UL or DL BWP using a DCI field. The four code points in that DCI field map to the RRC-configured BWP-ID as follows: For up to 3 configured BWPs (in addition to the initial BWP) the DCI code point is equivalent to the BWP ID (initial = 0, first dedicated = 1, . . . ). If the NW configures 4 dedicated bandwidth parts, they are identified by DCI code points 0 to 3. In this case it is not possible to switch to the initial BWP using the DCI field. Corresponds to L1 parameter 'DL-BWP-index'. (see 38.211, 38.213, section 12) |

| BWP-DownlinkCommon field descriptions |
| --- |
| pdcch-ConfigCommon |
| Cell specific parameters for the PDCCH of this BWP |
| pdsch-ConfigCommon |
| Cell specific parameters for the PDSCH of this BWP |

| BWP-DownlinkDedicated field descriptions |
| --- |
| pdcch-Config |
| UE specific PDCCH configuration for one BWP |
| pdsch-Config |
| UE specific PDSCH configuration for one BWP |

| BWP-Uplink field descriptions |
| --- |
| bwp-Id |
| An identifier for this bandwidth part. Other parts of the RRC configuration use the BWP-Id to associate themselves with a particular bandwidth part. The BWP ID = 0 is always associated with the initial BWP and may hence not be used here (in other bandwidth parts).<br>The NW may trigger the UE to swtich UL or DL BWP using a DCI field. The four code points in that DCI field map to the RRC-configured BWP-ID as follows: For up to 3 configured BWPs (in addition to the initial BWP) the DCI code point is equivalent to the BWP ID (initial = 0, first dedicated = 1, . . . ). If the NW configures 4 dedicated bandwidth parts, they are identified by DCI code points 0 to 3. In this case it is not possible to switch to the initial BWP using the DCI field. Corresponds to L1 parameter 'UL-BWP-index'. (see 38.211, 38.213, section 12) |

| BWP-UplinkCommon field descriptions |
| --- |
| pucch-ConfigCommon |
| cell specific parameters for the PUCCH |
| pusch-ConfigCommon |
| cell specific parameters for the PUSCH |

| BWP-UplinkDedicated field descriptions |
| --- |
| pucch-Config |
| PUCCH configuration for one BWP of the regular UL or SUL of a serving cell. If the UE is configured with SUL, the network configures PUCCH only on the BWPs of one of the uplinks (UL or SUL). The network configures PUCCH-Config for each SpCell. If supported by the UE, the network may configure at most one additional SCell of a cell group with PUCCH-Config (i.e. PUCCH SCell). |
| pusch-Config |
| PUSCH configuration for one BWP of the regular UL or SUL of a serving cell. If the UE is configured with SUL and if it has a PUSCH-Config for both UL and SUL, a carrier indicator field in DCI indicates for which of the two to use an UL grant. See also L1 parameter 'dynamicPUSCHSUL' (see 38.213, section FFS_Section) |

SlotFormatCombinationsPerCell

The IE SlotFormatCombinationsPerCell is used to configure the SlotFormatCombinations applicable for one serving cell. Corresponds to L1 parameter 'cell-to-SFI' (see 38.213, section 11.1.1).

SlotFormatCombinationsPerCell information element

```
-- ASN1START
-- TAG-SLOTFORMATCOMBINATIONSPERCELL-START
SlotFormatCombinationsPerCell ::=        SEQUENCE {
    servingCellId                            ServCellIndex,
    subcarrierSpacing                        SubcarrierSpacing,
    subcarrierSpacing2                       SubcarrierSpacing               OPTIONAL,  -- Need R
    slotFormatCombinations                   SEQUENCE (SIZE (1..maxNrofSlotFormatCombinationsPerSet))
OF SlotFormatCombination        OPTIONAL,
    positionInDCI                            INTEGER(0..maxSFI-DCI-PayloadSize-1)    OPTIONAL,
    ...
}
SlotFormatCombination ::=                SEQUENCE {
    slotFormatCombinationId                  SlotFormatCombinationId,
    slotFormats                              SEQUENCE (SIZE (1..maxNrofSlotFormatsPerCombination)) OF
INTEGER (0..255)
}
```

| SlotFormatCombinationsPerCell information element |
|---|
| SlotFormatCombinationId ::=                INTEGER (0..maxNrofSlotFormatCombinationsPerSet-1)<br>-- TAG-SLOTFORMATCOMBINATIONSPERCELL-STOP<br>-- ASN1STOP |

| SlotFormatCombination field descriptions |
|---|
| slotFormatCombinationId |
| This ID is used in the DCI payload to dynamically select this SlotFormatCombination. Corresponds to L1 parameter 'SFI-index' (see 38.213, section FFS_Section) |
| slotFormats |
| Slot formats that occur in consecutive slots in time domain order as listed here. The the slot formats are defined in 38.211, table 4.3.2-3 and numbered with 0 . . . 255. |

| SlotFormatCombinationsPerCell field descriptions |
|---|
| positionInDCI |
| The (starting) position (bit) of the slotFormatCombinationId (SFI-Index) for this serving cell (servingCellId) within the DCI payload. Corresponds to L1 parameter 'SFI-values' (see 38.213, section FFS_Section) |
| servingCellId |
| The ID of the serving cell for which the slotFormatCombinations are applicable |
| slotFormatCombinations |
| A list with SlotFormatCombinations. Each SlotFormatCombination comprises of one or more SlotFormats (see 38.211, section 4.3.2). The total number of slotFormats in the slotFormatCombinations list does not exceed 512. FFS_CHECK: RAN1 indicates that the combinations could be of two different types . . . but they don't specify the second |
| subcarrierSpacing2 |
| Reference subcarrier spacing for a Slot Format Combination on an FDD or SUL cell. Corresponds to L1 parameter 'SFI-scs2' (see 38.213, section FFS_Section). For FDD, subcarrierSpacing (SFI-scs) is the reference SCS for DL BWP and subcarrierSpacing2 (SFI-scs2) is the reference SCS for UL BWP. For SUL, subcarrierSpacing (SFI-scs) is the reference SCS for non-SUL carrier and subcarrierSpacing2 (SFI-scs2) is the reference SCS for SUL carrier. The network configures a value that is smaller than or equal to any SCS of configured BWPs of the serving cell that the command applies to. And the network configures a value that is smaller than or equal to the SCS of the serving cell which the UE monitors for SFI indications. |
| subcarrierSpacing |
| Reference subcarrier spacing for this Slot Format Combination. The network configures a value that is smaller than or equal to any SCS of configured BWPs of the serving cell that the command applies to. And the network configures a value that is smaller than or equal to the SCS of the serving cell which the UE monitors for SFI indications. Corresponds to L1 parameter 'SFI-scs' (see 38.213, section FFS_Section) |

SlotFormatIndicator

The IE SlotFormatindicator is used to configure monitoring a Group-Common-PDCCH for Slot-Format-Indicators (SFI).

| SlotFormatIndicator information element |
|---|
| -- ASN1START<br>-- TAG-SLOTFORMATINDICATOR-START<br>SlotFormatIndicator ::=          SEQUENCE {<br>  sfi-RNTI                             RNTI-Value,<br>  dci-PayloadSize               INTEGER (1..maxSFI-DCI-PayloadSize),<br>  slotFormatCombToAddModList      SEQUENCE (SIZE(1..maxNrofAggregatedCellsPerCellGroup)) OF |

| SlotFormatIndicator information element | |
|---|---|
| SlotFormatCombinationsPerCell | OPTIONAL, -- Need N |
| slotFormatCombToReleaseList | SEQUENCE (SIZE(1..maxNrofAggregatedCellsPerCellGroup)) OF |
| ServCellIndex | OPTIONAL, -- Need N |
| ... | |
| } | |
| -- TAG-SLOTFORMATINDICATOR-STOP | |
| -- ASN1STOP | |

| SlotFormatIndicator field descriptions |
|---|
| dci-PayloadSize |
| Total length of the DCI payload scrambled with SFI-RNTI. Corresponds to L1 parameter 'SFI-DCI-payload-length' (see 38.213, section 11.1.1) |
| sfi-RNTI |
| RNTI used for SFI on the given cell Corresponds to L1 parameter 'SFI-RNTI' (see 38.213, section 11.1.1) |
| slotFormatCombToAddModList |
| A list of SlotFormatCombinations for the UE's serving cells. Corresponds to L1 parameter 'SFI-cell-to-SFI' (see 38.213, section 11.1.1) |

3GPP TS 38.121 describes a DCI format for indicating slot format as follows:

7.3.1 DCI Formats

Figure 8:
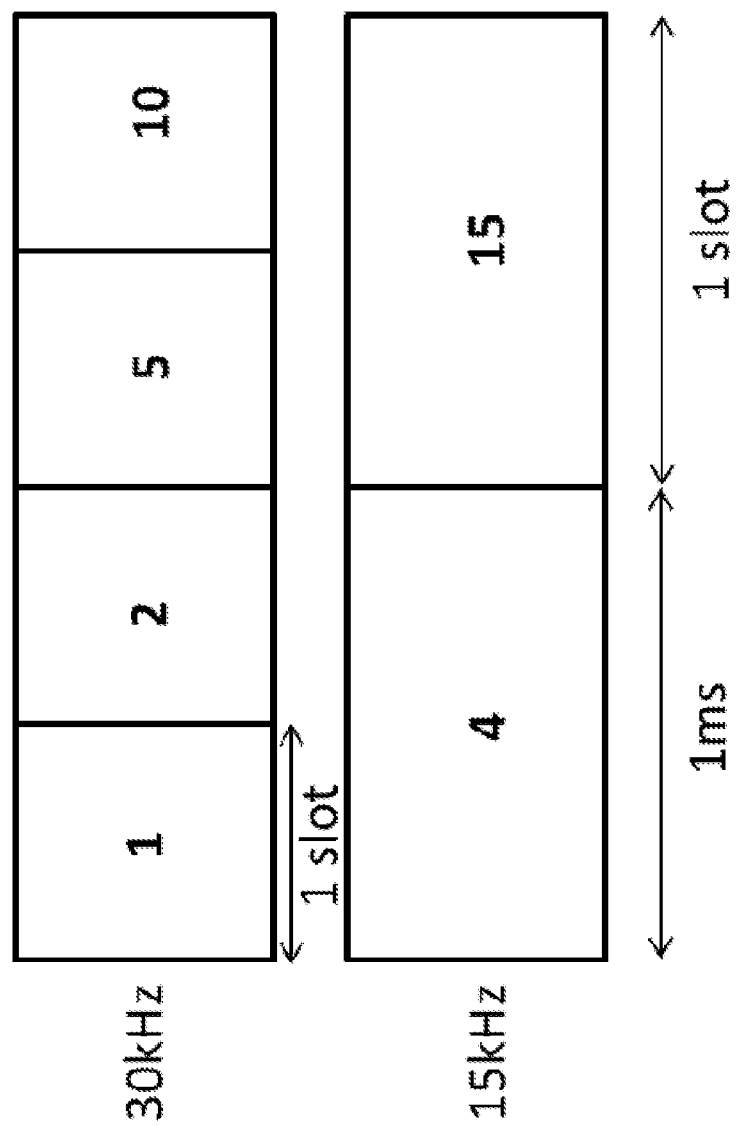
FIG. 8 is a diagram according to one exemplary embodiment.

The DCI formats defined in table 7.3.1-1 are supported. [Table 7.3.1-1 of 3GPP TS 38.121 V15.2.0, entitled "DCI formats", is reproduced as FIG. 8]

7.3.1.3.1 Format 2_0

DCI format 2_0 is used for notifying the slot format.
The following information is transmitted by means of the DCI format 2_0 with CRC scrambled by SFI-RNTI:
   Slot format indicator 1, Slot format indicator 2, . . . , Slot format indicator N.
   The size of DCI format 2_0 is configurable by higher layers up to 128 bits, according to Subclause 11.1.1 of [5, TS 38.213].
One or multiple of following terminologies may be used hereafter:
BS: A network central unit or a network node in NR which is used to control one or multiple TRPs which are associated with one or multiple cells. Communication between BS and TRP(s) is via fronthaul. BS could also be referred to as central unit (CU), eNB, gNB, or NodeB.
TRP: A transmission and reception point provides network coverage and directly communicates with UEs. TRP could also be referred to as distributed unit (DU) or network node.
Cell: A cell is composed of one or multiple associated TRPs, i.e. coverage of the cell is composed of coverage of all associated TRP(s). One cell is controlled by one BS. Cell could also be referred to as TRP group (TRPG).
Serving beam: A serving beam for a UE is a beam generated by a network node, e.g. TRP, which is currently used to communicate with the UE, e.g. for transmission and/or reception.
Candidate beam: A candidate beam for a UE is a candidate of a serving beam. Serving beam may or may not be candidate beam.

In NR, frame structure could be more flexible than that of LTE. Slot format in NR could be signaled via semi-static signaling, and/or dynamic signaling. Moreover, dynamic signaling could be a group common signaling and/or a unicast signaling. In 3GPP TS 38.213, a group common signaling could be downlink control information (DCI) format 2_0. One or more slot format indication (SFI)-index field values could be indicated by a DCI format 2_0. A SFI-index field value could refer to slot format or frame structure of a (active) serving cell. A SFI-index field value could indicate an entry index and the entry index could represent a slot format combination. The slot format combination could indicate one or more slot format values. If a slot format combination comprises a slot format value or the amount of slot format values in a slot format combination is one, the slot format combination would indicate slot format of a reference slot by the slot format value. If a slot format combination comprises multiple slot format values or the amount of slot format value in a slot format combination is more than one, the slot format combination indicates slot format of multiple reference slots by multiple slot format values. Time duration of the reference slot depends on a reference subcarrier spacing. A slot format value could indicate transmitted direction or state or functionality of each OFDM symbol in a slot. A transmitted direction or state or functionality of an OFDM symbol could be at least "downlink", "uplink", or "flexible".

For paired spectrum operated in a NR cell, a slot format combination indicated by DCI format 2_0 could be interpreted according to NR PHY spec (as discussed in 3GPP TS 38.213). A UE is configured with a first reference subcarrier spacing configuration $\mu_{SFI,DL}$ for the downlink spectrum or bandwidth part (BWP) and a second subcarrier spacing configuration $\mu_{SFI,UL}$ for the uplink spectrum/BWP. If $\mu_{SFI,DL} \geq \mu_{SFI,UL}$, for each $2^{(\mu_{SFI,DL}-\mu_{SFI,UL})}+1$ slot format values, the first $2^{(\mu_{SFI,DL}-\mu_{SFI,UL})}$ slot format values could indicate slot formats for the downlink spectrum or BWP, and the next or the last slot format value could indicate slot format for the uplink spectrum/BWP. If $\mu_{SFI,DL} < \mu_{SFI,UL}$, for each $2^{(\mu_{SFI,UL}-\mu_{SFI,DL})}+1$ slot format values, the first slot format value could indicate slot format for the downlink spectrum or BWP and the next or the remaining $2^{(\mu_{SFI,UL}-\mu_{SFI,DL})}$ slot format values could indicate slot formats for the uplink spectrum or BWP. Similar interpretation could also apply for slot format indication for normal UL carrier and supplementary UL carrier when unpaired spectrum is configured.

However, if the amount of slot format values in a slot format combination could not be divided by $2^{(\mu_{SFI,DL}-\mu_{SFI,UL})}+1$ or $2^{(\mu_{SFI,UL}-\mu_{SFI,DL})}+1$, how would the UE treat the residual (or remaining or orphan) slot format value(s) in the slot format combination. This issue could also occur when DCI format 2_0 indicates a slot format combination for supplementary uplink (SUL) carrier and non-SUL carrier. Possible solutions for the issue are described below.

Some general concepts of this invention are described as follow. One general concept is that UE does not expect to receive a slot format combination wherein the amount of slot format values in the slot format combination could not be divided by a number. In one embodiment, the slot format combination could indicate slot format for a first BWP and a second BWP. The number could be associated with a ratio. The ratio could be SCS (Subcarrier Spacin) of the first BWP to SCS of the second BWP or SCS of the second BWP to SCS of the first BWP. Alternatively, the number could be the ratio +1.

Another general concept is that UE may receive a slot format combination, wherein the amount of slot format values in the slot format combination could not be divided by the number. In one embodiment, if a UE is configured with or receives a slot format combination, wherein the amount of slot format values in the slot format combination could not be divided by a number, the UE pads one or more than one slot format values (e.g. slot format value 255) until the amount of slot format values in the SFI combination could be divided by the number. Also, if a UE is configured with or receives a slot format combination, wherein the amount of slot format values in the slot format combination could not be divided by a number, the UE assumes or pads [the number−mod(the amount of slot format values, the number)] slots format values (e.g. slot format value 255) in the rear of the amount of slot format values in the slot format combination.

Alternatively, if a UE is configured with or receives a slot format combination, wherein the amount of slot format values in the slot format combination could not be divided by a number, the UE assumes or pads [the number−mod(the amount of slot format values, the number)] slots format values in the front of the amount of slot format values in the slot format combination.

In one embodiment, the UE considers or determines slot format for the [the ratio−mod(the quantity of the first set of slots, the ratio)] slots same as that of slots when SFI is not indicated or received. In one embodiment, if the UE is configured to receive a slot format combination periodically, the UE may not perform transmission (or reception configured RS/channel) except for monitoring or receiving PDCCH (Physical Downlink Control Channel) in control resource set (CORESET) in response to not detecting a slot format combination in a configured SFI (Slot Format Indication) transmission occasion, until detecting or receiving a slot format combination.

In one embodiment, the slot format combination could indicate slot format for a first BWP and a second BWP. The number could be associated with a ratio of SCS of the first BWP to SCS of the second BWP or with a ratio of SCS of the second BWP to SCS of the first BWP. The number could also be the ratio +1. For unpaired spectrum, when a DL BWP index corresponding to a DL BWP is equal to a UL BWP index corresponding to a UL BWP, the DL BWP is linked with the UL BWP. For unpaired spectrum, when a DL BWP index corresponding to a DL BWP is equal to a UL BWP index corresponding to a UL BWP, the center frequency for the DL BWP is the same as the center frequency for the UL BWP. For paired spectrum, when a DL BWP index corresponding to a DL BWP is equal to a UL BWP index corresponding to a UL BWP, the DL BWP is not linked with the UL BWP. For paired spectrum, a configured DL BWP is not linked with any configured UL BWP. For paired spectrum, when a DL BWP index corresponding to a DL BWP is equal to a UL BWP index corresponding to a UL BWP, the center frequency for the DL BWP is different from the center frequency for the UL BWP. For paired spectrum, the center frequency for a DL BWP is different from the center frequency for any configured UL BWP. For unpaired spectrum, a DL BWP and a UL BWP could be switched simultaneously or could be switched by a same or single BWP-switching DCI (or a DCI indicating a BWP different from current active BWP). For paired spectrum, a DL BWP and a UL BWP could be switched independently or could not be switched by a same or single BWP-switching DCI (or a DCI indicating a BWP different from current active BWP). Any concepts discussed above can be formed or combined to form an embodiment.

Embodiment 1—Network is not allowed to configure or indicate a slot format combination, wherein the amount of slot format values in the slot format combination could not be divided by a number. In one embodiment, network may prevent from configuring or indicating a slot format combination, wherein the amount of slot format values in the slot format combination could not be divided by a number. Furthermore, network may prevent from or may be not allowed to set the amount of slot format values in a slot format combination to be not divided by a number.

A UE does not expect to receive a slot format combination, wherein the amount of slot format values in the slot format combination could not be divided by a number. In one embodiment, if the UE receives the slot format combination, the UE could ignore the slot format combination. Furthermore, if the UE receives the slot format combination, the UE could discard the slot format combination. Additionally or alternatively, if the UE receives the slot format combination, the UE may not use the information indicated in the slot format combination.

In one embodiment, if the UE receives the slot format combination, the UE could deem or consider it as an error case. Alternatively, if the UE receives the slot format combination, the UE could consider the slot format combination as an inconsistent control signal. Additionally, if the UE receives the slot format combination indicated by a downlink control information (DCI), the UE could deem or consider that the DCI or the slot format combination is not detected. Furthermore, behavior of the UE in response to the received slot format combination is the same as that of not detecting the slot format combination or not detecting the DCI.

In one embodiment, network could determine a slot format combination based on the number. In particular, network could determine the amount of slot format values in a slot format combination based on the number. However, network may not (be allowed to) determine the amount of slot format values in a slot format combination which is not based on the number.

In one embodiment, network could determine a slot format combination such that the amount of slot format values in the slot format combination could be divided by the number. Network could also determine whether a slot format combination could be indicated for a cell operated with paired spectrum based on the amount of slot format values in the slot format combination.

In one embodiment, network is not allowed to indicate or configure a slot format combination if the amount of slot format values in the slot format combination could not be divided by the number. Furthermore, network could configure a UE with a first (reference) subcarrier spacing (SCS) configuration. In one embodiment, value of or value corresponding to the first SCS configuration could be {−2, −1, 0, 1, 2, 3, 4}.

In one embodiment, network could configure a UE with a second (reference) subcarrier spacing (SCS) configuration. The value of or value corresponding to the second SCS configuration could be {−2, −1, 0, 1, 2, 3, 4}.

In one embodiment, the first SCS configuration could be used to indicate a (reference) slot for a downlink bandwidth part, an uplink bandwidth part, a SUL carrier, or a non-SUL (UL) carrier. In addition, the second SCS configuration could be used to indicate a (reference) slot for a downlink bandwidth part, an uplink bandwidth part, a SUL carrier, or a non-SUL (UL) carrier.

In one embodiment, the first SCS configuration could be applied for a reference DL BWP. The second SCS configuration could be applied for a reference UL BWP. The first SCS configuration could be applied for a reference first UL carrier, which could be named as a first reference UL carrier. The second SCS configuration could be applied for a reference second UL carrier, which could be named as a second reference UL carrier.

In one embodiment, a slot format value could indicate a slot format of a (reference) slot, wherein duration of the (reference) slot could be determined based on the first SCS configuration or the second SCS configuration. Furthermore, a slot format value could indicate a slot format of a (reference) slot, wherein duration of the (reference) slot could be determined based on the ratio of the first SCS configuration to the second SCS configuration.

In one embodiment, time duration of a (reference) slot for a reference downlink bandwidth part, an uplink bandwidth part, a SUL carrier, or a non-SUL (UL) carrier may be determined based on the first SCS configuration and/or the second SCS configuration rather than (actual) SCS of an active downlink bandwidth part, an uplink bandwidth part, a SUL carrier, or a non-SUL (UL) carrier. If time duration of a (reference) slot is larger than time duration of a slot determined based on SCS of an active downlink bandwidth part, an uplink bandwidth part, a SUL carrier, or a non-SUL (UL) carrier, the slot format for the (reference) slot could indicate slot format of multiple slots within the (reference) slot.

For example, assuming time duration of a (reference) slot is determined based on 15 kHz SCS (i.e. SCS configuration $\mu$=0) and a UE receives a slot format combination indicating a slot format value intended for an active downlink bandwidth part (or an uplink bandwidth part, a SUL carrier, or a non-SUL (UL) carrier), SCS of which is 60 kHz SCS. In one embodiment, if the slot format value indicates a slot format as {DDDXXXXXXXXXUU}, the UE may deem the slot format for a 15 kHz SCS slot. The UE may repeat the slot format for one symbol 4 times, wherein a transmitted direction/state for one symbol repeats 4 times. In other words, the UE may consider a same indicated transmitted direction or functionality or state are applied for four consecutive symbols. Slot format of four 60 kHz SCS slots could be {DDDDDDDDDDDDXX}, {XXXXXXXXXXXXXX}, {XXXXXXXXXXXXXX}, {XXXXXXUUUUUUUU}.

In one embodiment, the value of the first SCS configuration could be different from or the same as value of the second SCS configuration. The number could be one plus $n^{th}$ power of 2 (i.e. $2^n+1$). The exponent "n" could be to an absolute value of difference between a value of (or a value corresponding to) first SCS configuration and a value of (or a value corresponding to) the second SCS configuration.

In one embodiment, if value of the first SCS configuration is larger than or equal to value of the second SCS configuration, for each $2^n+1$ slot format values, the first $n^{th}$ power of 2 slot format values could be used for the first SCS configuration and the next or left (one) slot format value could be used for the second SCS configuration. Furthermore, if value of the first SCS configuration is smaller than value of the second SCS configuration, for each $2^n+1$ slot format values, the first one slot format value could be used for the first SCS configuration and the next or left $n^{th}$ power of 2 slot format values could be used for the second SCS configuration.

In one embodiment, slot format values indicated in the slot format combination could be applied for a first BWP and a second BWP. In one embodiment, the (reference) first SCS configuration could be for the first BWP, and the (reference) second SCS configuration could be for the second BWP. The number could be associated with a ratio.

In one embodiment, the ratio could be a reference SCS of the first BWP to a reference SCS of the second BWP. For example, if the reference SCS of the first BWP is 30 KHz and the reference SCS of the second BWP is 15 KHz, then the ratio would be 2.

Alternatively, the ratio could be a reference SCS of the second BWP to a reference SCS of the first BWP. The exponent "n" could be the ratio. The number could be the ratio +1.

In one embodiment, network could indicate a slot format combination by a downlink control information (DCI). The DCI could be DCI format 2_0.

In one embodiment, a slot format indicated by a slot format value could be applied on a (reference) slot, wherein time duration of the (reference) slot is determined based on the first SCS configuration and/or the second SCS configuration. If a slot format combination is used to indicate slot format of paired spectrum, a slot format value applied on a (reference) slot with time duration determined based on the first SCS configuration could be used to indicate slot format of one or more than one slot of DL BWP/spectrum or UL BWP/spectrum. Furthermore, if a slot format combination is used to indicate slot format of paired spectrum, a slot format value applied on a (reference) slot with time duration determined based on the second SCS configuration could be used to indicate slot format of one or more than one slot of UL BWP/spectrum or DL BWP/spectrum.

Furthermore, if a slot format combination is used to indicate slot format of SUL carrier and slot format of non-SUL carrier, a slot format value applied on a (reference) slot with time duration determined based on the first SCS configuration could be used to indicate slot format of one or more than one slot of SUL carrier or non-SUL (UL) carrier. Furthermore, if a slot format combination is used to indicate slot format of SUL carrier and slot format of non-SUL carrier, a slot format value applied on a (reference) slot with time duration determined based on the second SCS configuration could be used to indicate slot format of one or more than one slot of non-SUL (UL) carrier or SUL carrier.

In one embodiment, the first SCS configuration could be subcarrierSpacing in SlotFormatCombinationsPerCell information element. Furthermore, the second SCS configuration could be subcarrierSpacing2 in SlotFormatCombinationsPerCell information element.

Alternatively, the first SCS configuration could be $\mu_{SFI}$, or $\mu_{SFI,DL}$, or $\mu_{SFI,UL}$, or $\mu_{SFI,SUL}$. Furthermore, the second SCS configuration could be $\mu_{SFI}$, or $\mu_{SFI,DL}$, or $\mu_{SFI,UL}$, or $\mu_{SFI,SUL}$.

For example, assuming the first SCS configuration is $\mu$=1 (i.e. SCS=30 KHz) and the second SCS configuration is $\mu$=0 (i.e. SCS=15 KHz), the number could be 3 (i.e. $2^1+1$ or 30/15+1). In this example, if network operates on a serving cell operated with a paired spectrum, network indicates a slot format combination for the serving cell, wherein the slot format combination is determined based on the number. Network is not allowed to indicate a slot format combination that the amount of slot format values in the slot format combination is not divided by the number (i.e. 3). That is, if a slot format combination is {0, 1, 2, 7, 11}, which comprises 5 slot format values, network prevents from or does not indicate the slot format combination to a UE. In the same example, the amount of slot format values in a slot format combination is restricted to able to be divided by the number (i.e. the amount of slot format values is multiple of 3).

In one embodiment, slot format value(s) in a slot format combination shall be applied starting or aligning from a slot in which the UE receives a DCI indicating the slot format combination. For paired spectrum, slot format value(s) applied for slot(s) in DL BWP or spectrum, the UE shall apply the slot format values starting or aligning from beginning of a slot in which the UE receives a DCI indicating the slot format combination. Furthermore, for paired spectrum, for slot format value(s) applied for slot(s) in UL BWP/spectrum, the UE shall apply the slot format values starting from an uplink slot which is aligning from beginning of a slot, where the UE receives a DCI indicating the slot format combination.

Figure 11:
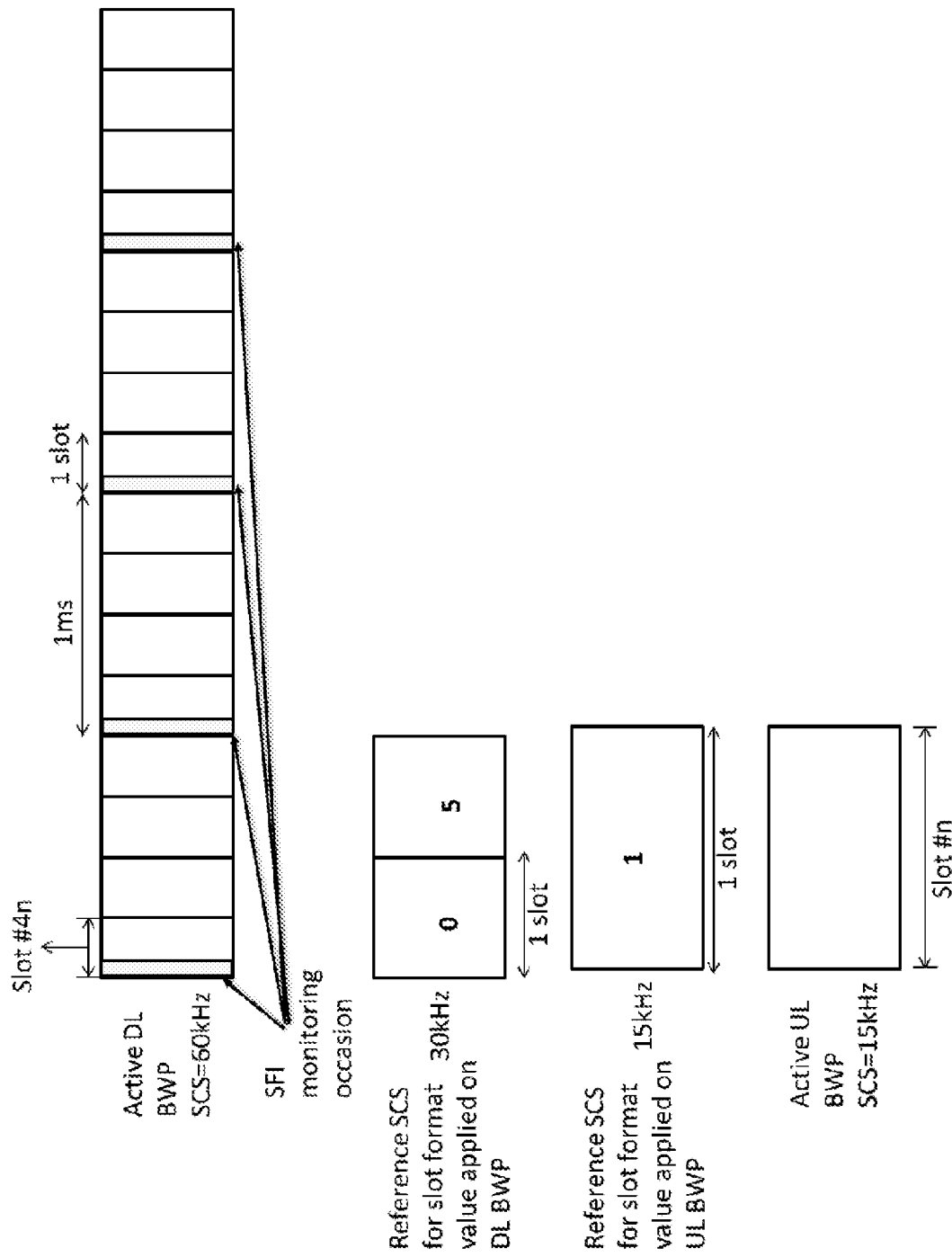
FIG. 11 is a diagram according to one exemplary embodiment.

In addition, for slot format value(s) applied for slot(s) in unpaired spectrum, the UE shall apply the slot format values starting or aligning from beginning of a slot, where the UE receives a DCI indicating the slot format combination. For example, as shown in FIG. 11, assuming SCS of active DL BWP is 60 kHz, SFI monitoring occasion (occasion for indicating a slot format combination) is in periods of 4 slots based on 60 kHz SCS. If a UE performs transmission on a cell operated with paired spectrum, the UE could receive a slot format combination indicating slot format for slot(s) in DL BWP and slot(s) in UL BWP. The UE is configured with a reference SCS for slot format value applied on DL BWP which is assumed as 30 kHz and a reference SCS for slot format value applied on UL BWP which is assumed as 15 kHz. In this example, if a UE receives a slot format combination as {0, 5, 1} in slot #4n, slot format values {0} and {5} could indicate slot format for two 30 kHz slots and slot format {1} could indicate one slot format for one 15 kHz slot. Slot format of a 30 kHz slot could be applied on two consecutive 60 kHz slots in DL BWP. Slot format of a 30 kHz indicated by {0} shall be applied starting from slot #4n in DL BWP. Slot format of a 15 kHz slot could be applied on one 15 kHz slot. Slot format of a 30 kHz indicated by {1} shall be applied starting from slot #n in UL BWP. In this example, first slot format value applied on DL BWP (i.e. slot format value {0}) and first slot format value applied on UL BWP (i.e. slot format value {1}) shall be applied from beginning of a slot where the slot format combination is transmitted.

In one embodiment, network may operate on a serving cell with a paired spectrum. Furthermore, network may operate or communicate via Frequency-Division Duplexing (FDD). Alternatively, network may operate on a serving cell with an unpaired spectrum. Furthermore, network may operate or communicate via Time-Division Duplexing (TDD). In addition, network may serve a cell with a supplementary uplink (SUL) carrier. Network may also receive UL transmission on a supplementary uplink (SUL) carrier.

In one embodiment, the UE may operate on a serving cell with a paired spectrum. Furthermore, the UE may operate or communicate via Frequency-Division Duplexing (FDD). Alternatively, the UE may operate on a serving cell with an unpaired spectrum. Furthermore, the UE may operate or communicate via Time-Division Duplexing (TDD). In addition, the UE may serve a cell with a supplementary uplink (SUL) carrier. The UE may also transmit UL transmission on a supplementary uplink (SUL) carrier.

In one embodiment, a slot format value may correspond to a predetermined or configured combination, which comprises transmission direction/state or functionality of each symbol in a slot. Possible value of a slot format value could be in the range of [0, 255].

Embodiment 2—A UE could be indicated or receive a slot format combination that the amount of slot format values in the slot format combination could not be divided by a number. The slot format combination could be indicated by a downlink control information (DCI). The DCI could be DCI format 2_0.

In one embodiment, if a UE is configured or receives a slot format combination, wherein the amount of slot format values in the slot format combination could not be divided by the number, the UE could assume or pad [the number−mod(the amount of slot format values, the number)] slots format values in the rear of the amount of slot format values in the slot format combination. Alternatively, if a UE is configured with or receives a slot format combination, wherein the amount of slot format values in the slot format combination could not be divided by the number, the UE could assume or pad [the number−mod(the amount of slot format values, the number)] slots format values in the front of the amount of slot format values in the slot format combination.

In one embodiment, [the number−mod(the amount of slot format values, the number)] slots format values could be particular slot format value. Furthermore, [the number−mod(the amount of slot format values, the number)] slots format values could be an empty and/or blank slot format value. In addition, the amount of slot format values in the slot format combination plus the amount of padded or assumed [the number−mod(the amount of slot format values, the number)] slots format values could be a multiple of the number.

In one embodiment, the UE could interpret the amount of slot format values and the assumed or padded slot format values based on a rule. Furthermore, the UE could interpret the one or more than one residual or remainder slot format values and one or more than one empty or blank slot format value based on a rule. The particular slot format value could be "255".

Figure 10:
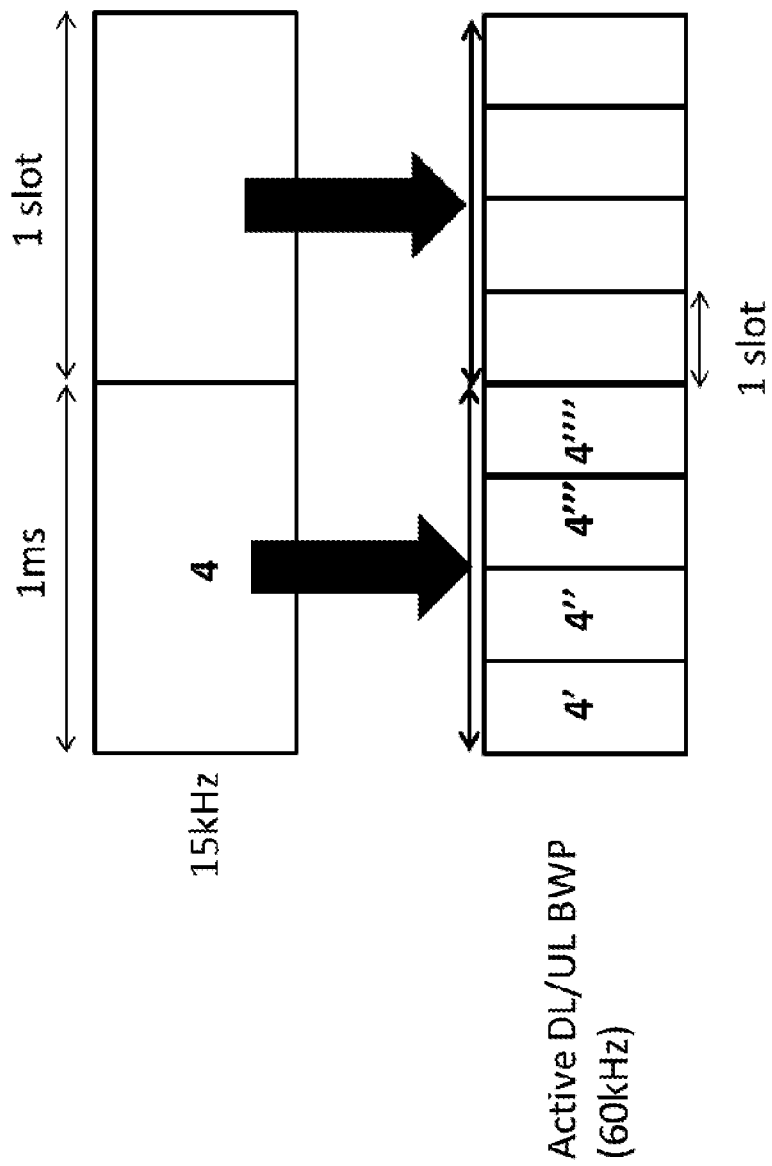
FIG. 10 is a diagram according to one exemplary embodiment.

In one embodiment, if a UE receives a slot format value "255" for a set of slots or consider/assume slot format value "255" for a set of slots, the UE could assume slot format of a set of slot as "flexible". For example, in FIG. 10, the set could be the right four 60 kHz SCS slots.

In one embodiment, if slot format of one or more slots is indicated, considered, or assumed to be a slot format value "255", the UE could perform transmission or reception on (pre)configured resource in the one or more than one slot (if no DCI indicates collided transmitted direction or state or functionality). Furthermore, if slot format of one or more slots is indicated as a slot format value "255", the UE could perform (pre)configured transmission or reception (if no DCI indicates collided transmitted direction or state or functionality). The (pre)configured transmission or reception could be control resource set (CORESET) monitoring, periodical reference signal measurement, SPS PDSCH reception, configured grant transmission.

In one embodiment, if a UE receives a slot format value "255", the UE could assume that slot format of one or more than one slot is referenced (or followed or determined) based on semi-static configuration. The semi-static configuration could be tdd-UL-DL-ConfigurationCommon, tdd-UL-DL-ConfigurationCommon2, and/or tdd-UL-DL-ConfigDedicated.

In one embodiment, the UE is configured with a first (reference) subcarrier spacing (SCS) configuration. The value of or value corresponding to the first SCS configuration could be {−2, −1, 0, 1, 2, 3, 4}.

Alternatively, the UE is configured with a second (reference) subcarrier spacing (SCS) configuration. The value of or value corresponding to the second SCS configuration could be {−2, −1, 0, 1, 2, 3, 4}.

In one embodiment, the first SCS configuration could be used to indicate a (reference) slot for a downlink bandwidth part, an uplink bandwidth part, a SUL carrier, or a non-SUL (UL) carrier. Furthermore, the second SCS configuration could be used to indicate a (reference) slot for a downlink bandwidth part, an uplink bandwidth part, a SUL carrier, and a non-SUL (UL) carrier. The first SCS configuration could be applied for a reference DL BWP. The second SCS configuration could be applied for a reference UL BWP. The first SCS configuration could be applied for a reference first UL carrier, which could be named as a first reference UL carrier. The second SCS configuration could be applied for a reference second UL carrier, which could be named as a second reference UL carrier.

In one embodiment, a slot format value could indicate a slot format of a (reference) slot, wherein duration of the (reference) slot could be determined based on the first SCS configuration or the second SCS configuration. Alternatively, a slot format value could indicate a slot format of a (reference) slot, wherein duration of the (reference) slot could be determined based on the ratio of the first SCS configuration to the second SCS configuration.

In one embodiment, value of the first SCS configuration could be different from or the same as value of the second SCS configuration. The number could be one plus $n^{th}$ power of 2 (i.e. $2^n+1$). The exponent "n" could be to an absolute value of difference between value of (or value corresponding to) first SCS configuration and a value of (or a value corresponding to) the second SCS configuration.

In one embodiment, slot format values indicated in the slot format combination could be applied for a first BWP and a second BWP. The first (reference) SCS configuration could be for the first BWP. The second (reference) SCS configuration could be for the second BWP.

In one embodiment, the number could be associated with a ratio. The ratio could be a reference SCS of the first BWP to a reference SCS of the second BWP. For example, the reference SCS of the first BWP is 30 KHz and the reference SCS of the second BWP is 15 KHz, then the ratio would be 2.

In one embodiment, the ratio could be a reference SCS of the second BWP to a reference SCS of the first BWP. The exponent "n" could be the ratio. The number could be the ratio +1.

In one embodiment, network could indicate a slot format combination by a downlink control information (DCI). The DCI could be DCI format 2_0.

In one embodiment, a slot format indicated by a slot format value could be applied on a (reference) slot, wherein time duration of the (reference) slot is determined based on the first SCS configuration and/or the second SCS configuration. If a slot format combination is used to indicate slot format of paired spectrum, a slot format value applied on a (reference) slot with time duration determined based on the first SCS configuration could be used to indicate slot format of one or more than one slot of DL BWP/spectrum or UL BWP/spectrum. Alternatively, if a slot format combination is used to indicate slot format of paired spectrum, a slot format value applied on a (reference) slot with time duration determined based on the second SCS configuration could be used to indicate slot format of one or more than one slot of UL BWP/spectrum or DL BWP/spectrum. In addition, if a slot format combination is used to indicate slot format of SUL carrier and slot format of non-SUL carrier, a slot format value applied on a (reference) slot with time duration determined based on the first SCS configuration could be used to indicate slot format of one or more than one slot of SUL carrier or non-SUL (UL) carrier. Furthermore, if a slot format combination is used to indicate slot format of paired spectrum, a slot format value applied on a (reference) slot with time duration determined based on the second SCS configuration could be used to indicate slot format of one or more than one slot of non-SUL (UL) carrier or SUL carrier.

In one embodiment, the first SCS configuration could be subcarrierSpacing in SlotFormatCombinationsPerCell information element. Furthermore, the second SCS configuration could be subcarrierSpacing2 in SlotFormatCombinationsPerCell information element. In addition, the first SCS configuration could be $\mu_{SFI}$, or $\mu_{SFI,DL}$, or $\mu_{SFI,UL}$, or $\mu_{SFI,SUL}$, and the second SCS configuration could be $\mu_{SFI}$, or $\mu_{SFI,SUL}$, or $\mu_{SFI,DL}$, or $\mu_{SFI,UL}$, or $\mu_{SFI,SUL}$. For example, assuming the first SCS configuration is $\mu=1$ (i.e. SCS=30 KHz) and the second SCS configuration is $\mu=0$ (i.e. SCS=15 KHz), the number could be 3 (i.e. $2^1+1$ or 30/15+1).

In one embodiment, the rule could be that if value of the first SCS configuration is larger than or equal to value of the second SCS configuration, for each $2^n+1$ slot format values, the first $n^{th}$ power of 2 slot format values could be used for the first SCS configuration and the next or left (one) slot format value could be used for the second SCS configuration. Furthermore, the rule could be that if value of the first SCS configuration is smaller than value of the second SCS configuration, for each $2^n+1$ slot format values, the first one slot format value could be used for the first SCS configuration and the next or left $n^{th}$ power of 2 slot format values could be used for the second SCS configuration.

For example, as shown in FIG. 8, assuming a UE is configured with a serving cell operated with paired spectrum, the UE is configured with a first reference SCS configuration $\mu=1$ (i.e. SCS=30 KHz) and a second reference SCS configuration $\mu=0$ (i.e. SCS=15 KHz), the number could be 3. More specifically, the first reference SCS configuration could indicate slot format of reference slot for downlink BWP/spectrum, and the second reference SCS configuration could indicate slot format of reference slot for uplink BWP/spectrum. In this example, if the UE receives a slot format combination as {1, 2, 4, 5, 10, 15}, the UE may determine for each 3 slot format values. The UE may deem slot format value {1}, {2}, {5}, {10} indicates slot format of two 30 kHz slot and slot format value {4}, {15} indicates slot format of one 15 kHz slot.

Figure 9:
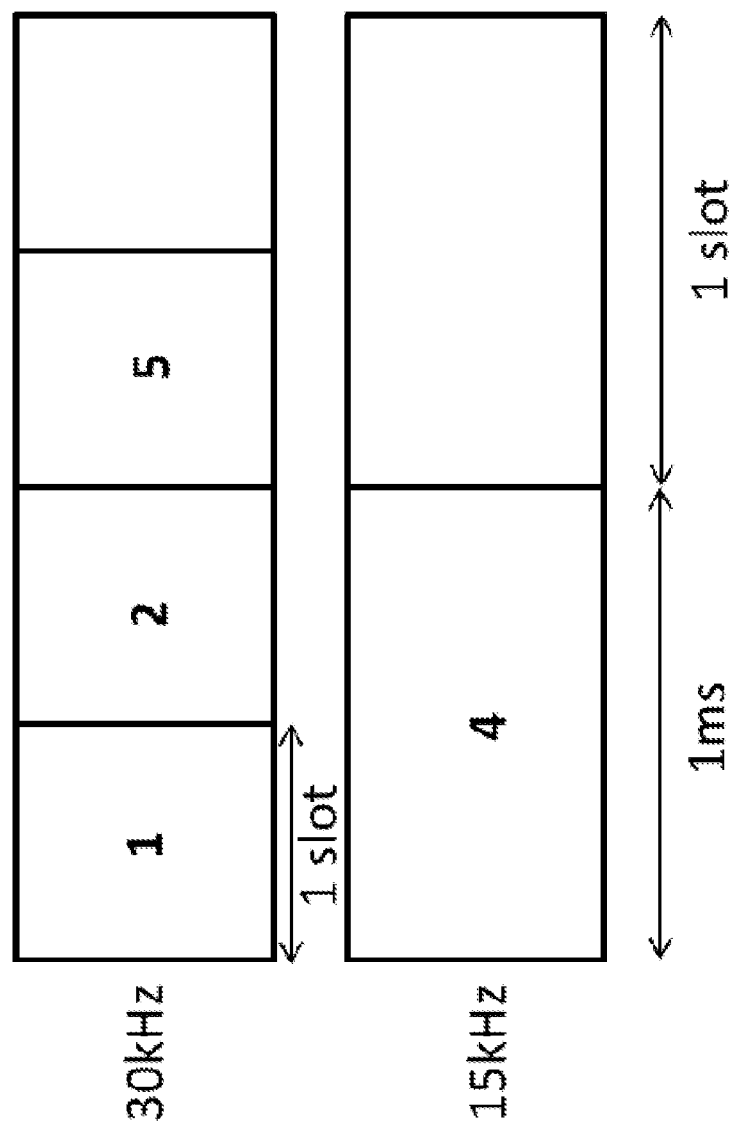
FIG. 9 is a diagram according to one exemplary embodiment.

In a similar example shown in FIG. 9, if the UE receives a DCI format 2_0 indicating a slot format combination as {1, 2, 4, 5} which could not be divided by the number, the UE could deem {1}, {2}, {5} for the first three 30 kHz slot and {4} for the first 15 kHz slot. One alternative is that the UE may deem slot format of the fourth 30 kHz slot and slot format of the second 15 kHz slot could be determined based on semi-static configuration. Alternatively, the UE could deem slot format of the fourth 30 kHz slot and slot format of the second 15 kHz slot as that of a slot if not detecting a SFI. Alternatively, the UE could deem slot format of the fourth 30 kHz slot and slot format of the second 15 kHz slot with all symbols as flexible.

In one embodiment, slot format value(s) in a slot format combination shall be applied starting from a slot in which the UE receives a DCI indicating the slot format combination. For paired spectrum, slot format value(s) applied for slot(s) in DL BWP or spectrum, the UE shall apply the slot format values starting from beginning of a slot in which the UE receives a DCI indicating the slot format combination. For paired spectrum, for slot format value(s) applied for slot(s) in UL BWP or spectrum, the UE shall apply the slot format values starting from an uplink slot which is aligned from beginning of a slot, where the UE receives a DCI indicating the slot format combination. In addition, for slot format value(s) applied for slot(s) in unpaired spectrum, the UE shall apply the slot format values starting or aligning from beginning of a slot, where the UE receives a DCI indicating the slot format combination.

For example, as shown in FIG. 11, assuming SCS of active DL BWP is 60 kHz, SFI monitoring occasion (occasion for indicating a slot format combination) is every 4 60 kHz slots. If a UE performs transmission on a cell operated with paired spectrum, the UE could receive a slot format combination indicating slot format for slot(s) in DL BWP and slot(s) in UL BWP. The UE is configured with a reference SCS for slot format value applied on DL BWP which is assumed as 30 kHz and a reference SCS for slot format value applied on UL BWP which is assumed as 15 kHz. In this example, if a UE receives a slot format combination as {0, 5, 1} in slot #4n, slot format values {0} and {5} could indicate slot format for two 30 kHz slots, and slot format {1} could indicate one slot format for one 15 kHz slot. Slot format of a 30 kHz slot could be applied on two consecutive 60 kHz slots in DL BWP. Slot format of a 30 kHz indicated by {0} shall be applied starting from slot #4n in DL BWP. Slot format of a 15 kHz slot could be applied on one 15 kHz slot. Slot format of a 30 kHz indicated by {1} shall be applied starting from slot #n in UL BWP. In this example, first slot format value applied on DL BWP (i.e. slot format value {0}) and first slot format value applied on UL BWP (i.e. slot format value {1}) shall be applied from beginning of a slot where the slot format combination is transmitted.

In one embodiment, the UE may transmit or receive transmission in a serving cell with a paired spectrum. More specifically, the UE may transmit or receive transmission in a serving cell via Frequency-Division Duplexing (FDD). Alternatively, the UE may transmit or receive transmission in a serving cell with an unpaired spectrum. More specifically, the UE may transmit/receive transmission in a serving cell via Time-Division Duplexing (TDD). In addition, the UE is configured with a supplementary uplink (SUL) carrier.

Embodiment 3—A UE could be indicated or could receive a slot format combination that the amount of slot format values in the slot format combination could not be divided by a number. The slot format combination could be indicated by a downlink control information (DCI). The DCI could be DCI format 2_0.

In one embodiment, the UE is configured with a first (reference) subcarrier spacing (SCS) configuration. The value of or value corresponding to the first SCS configuration could be {−2, −1, 0, 1, 2, 3, 4}. Furthermore, the UE could be configured with a second (reference) subcarrier spacing (SCS) configuration. The value of or value corresponding to the second SCS configuration could be {−2, −1, 0, 1, 2, 3, 4}.

In one embodiment, the first SCS configuration could be used to indicate a (reference) slot for a downlink bandwidth part, an uplink bandwidth part, a SUL carrier, or a non-SUL (UL) carrier. In addition, the second SCS configuration could be used to indicate a (reference) slot for a downlink bandwidth part, an uplink bandwidth part, a SUL carrier, and a non-SUL (UL) carrier.

In one embodiment, if a UE is configured with or receives a slot format combination, wherein the amount of slot format values in the slot format combination could not be divided by the number, if value of the first SCS configuration is larger than or equal to value of the second SCS configuration, the UE considers or determines the last mod(the amount of slot format values in the slot format combination, the number) slot format values are applicable to a reference DL BWP,
  in one embodiment, the UE considers or determines the last mod(the amount of slot format values in the slot format combination, the number) slot format values in the slot format combination are applicable to one or more slots in a DL BWP,
  in one embodiment, the UE performs reception in one or more symbols in one or more slots in a DL BWP, according to the last mod(the amount of slot format values in the slot format combination, the number) slot format values in the slot format combination,
  for one example, the amount of slot format values in the slot format combination is 5 and the number is 3, then, the last mod(5, 3) slot format values are applicable to a reference DL BWP. In the same example, slot format values in the slot format combination is {16, 11, 45, 23, 24}, then, {23, 24} are applicable to a reference DL BWP, if value of the first SCS configuration is smaller than value of the second SCS configuration, the UE considers or determines the first one slot format value in the last mod(the amount of slot format values in the slot format combination, the number) slot format values in the slot format combination are applicable to a reference DL BWP and the last [mod(the amount of slot format values in the slot format combination, the number)−1] slot format values in the slot format combination are applicable to a reference UL BWP,
  in one embodiment, the UE considers or determines the first one slot format value in the last mod(the amount of slot format values in the slot format combination, the number) slot format values in the slot format combination are applicable to one or more slots in a DL BWP,
  in one embodiment, the UE considers or determines the last [mod(the amount of slot format values in the slot format combination, the number)−1] slot format values in the slot format combination are applicable to one or more slots in a UL BWP,
  in one embodiment, the UE performs reception in one or more symbols in one or more slots in a DL BWP, according to the first one slot format value in the last mod(the amount of slot format values in the slot format combination, the number) slot format values in the slot format combination,
  in one embodiment, the UE performs transmission in one or more symbols in one or more slots in a UL BWP, according to the last [mod(the amount of slot format values in the slot format combination, the number)−1] slot format values in the slot format combination,
  for one example, the amount of slot format values in the slot format combination is 5 and the number is 3, then, the first one slot format value in last mod(5, 3) slot format values are applicable to a reference DL BWP; the last [mod(5, 3)−1] slot format values are applicable to a reference UL BWP. In the same example, slot format values in the slot format combination is {16, 11, 45, 23, 24}, then, {23} are applicable to a reference DL BWP; {24} are applicable to a reference UL BWP.

In one embodiment, the number could be associated with the ratio of reference SCS of the (reference) DL BWP to reference SCS of the (reference) UL BWP, In one embodiment, the number is associated with difference between reference SCS of the (reference) DL BWP and reference SCS of the (reference) UL BWP.

In one embodiment, if a UE is configured with or receives a slot format combination, wherein the amount of slot format values in the slot format combination could not be divided by the number, if value of the first SCS configuration is larger than or equal to value of the second SCS configuration, the UE, the UE considers or determines the last mod(the amount of slot format values in the slot format combination, the number) slot format values are applicable to a first reference UL carrier, in one embodiment, the UE considers or determines the last mod(the amount of slot format values in the slot format combination, the number) slot format values in the slot format combination are applicable to one or more slots in a first UL carrier, in one embodiment, the UE performs reception in one or more symbols in one or more slots in a first UL carrier, according to the last mod(the amount of slot format values in the slot format combination, the number) slot format values in the slot format combination, for one example, the amount of slot format values in the slot format combination is 5 and the number is 3, then, the last mod(5, 3) slot format values are applicable to a first reference UL carrier. In the same example, slot format values in the slot format combination is {16, 11, 45, 23, 24}, then, {23, 24} are applicable to a first reference UL carrier, if value of the first SCS configuration is smaller than value of the second SCS configuration, the UE considers or determines the first one slot format value in the last mod(the amount of slot format values in the slot format combination, the number) slot format values in the slot format combination are applicable to a first reference UL carrier and the last [mod(the amount of slot format values in the slot format combination, the number)−1] slot format values in the slot format combination are applicable to a second reference UL carrier, in one embodiment, the UE considers or determines the first one slot format value in the last mod(the amount of slot format values in the slot format combination, the number) slot format values in the slot format combination are applicable to one or more slots in a first UL carrier, in one embodiment, the UE considers or determines the last [mod(the amount of slot format values in the slot format combination, the number)−1] slot format values in the slot format combination are applicable to one or more slots in a second UL carrier, in one embodiment, the UE performs reception in one or more symbols in one or more slots in a first UL carrier, according to the first one slot format value in the last mod(the amount of slot format values in the slot format combination, the number) slot format values in the slot format combination, in one embodiment, the UE performs transmission in one or more symbols in one or more slots in a second UL carrier, according to the last [mod(the amount of slot format values in the slot format combination, the number)−1] slot format values in the slot format combination, for one example, the amount of slot format values in the slot format combination is 5 and the number is 3, then, the first one slot format value in last mod(5, 3) slot format values are applicable to a first reference UL carrier; the last [mod(5, 3)−1] slot format values are applicable to a second reference UL carrier.

In the same example, slot format values in the slot format combination is {16, 11, 45, 23, 24}, then, {23} are applicable to a first reference UL carrier; {24} are applicable to a second reference UL carrier.

In one embodiment, the number could be associated with the ratio of reference SCS of the first (reference) UL carrier to reference SCS of the second (reference) UL carrier, In one embodiment, the number could be associated with difference between reference SCS of the first (reference) UL carrier and reference SCS of the second (reference) UL carrier.

In one embodiment, if a UE is configured with or receives a slot format combination, wherein the amount of slot format values in the slot format combination could not be divided by the number, the UE considers or determines the last mod(the amount of slot format values in the slot format combination, the number) slot format values are applicable to a first reference UL carrier, in one embodiment, the UE considers or determines the last mod(the amount of slot format values in the slot format combination, the number) slot format values in the slot format combination are applicable to one or more slots in a first UL carrier, in one embodiment, the UE performs reception in one or more symbols in one or more slots in a first UL carrier, according to the last mod(the amount of slot format values in the slot format combination, the number) slot format values in the slot format combination, for one example, the amount of slot format values in the slot format combination is 5 and the number is 3, then, the last mod(5, 3) slot format values are applicable to a first reference UL carrier. In the same example, slot format values in the slot format combination is {16, 11, 45, 23, 24}, then, {23, 24} are applicable to a first reference UL carrier, In one embodiment, the number could be associated with the ratio of reference SCS of the first (reference) UL carrier to reference SCS of the second (reference) UL carrier, In one embodiment, the number could be associated with difference between reference SCS of the first (reference) UL carrier and reference SCS of the second (reference) UL carrier.

In one embodiment, the first SCS configuration could be applied for a reference DL BWP, and the second SCS configuration could be applied for a reference UL BWP. Furthermore, the first SCS configuration could be applied for a reference first UL carrier, which could be named as a first reference UL carrier. In addition, the second SCS configuration could be applied for a reference second UL carrier, which could be named as a second reference UL carrier.

In one embodiment, a slot format value could indicate a slot format of a (reference) slot, wherein duration of the (reference) slot could be determined based on the first SCS configuration or the second SCS configuration. Furthermore, a slot format value could indicate a slot format of a (reference) slot, wherein duration of the (reference) slot could be determined based on the ratio of the first SCS configuration to the second SCS configuration.

In one embodiment, value of the first SCS configuration could be different from or the same as value of the second SCS configuration. The number could be one plus $n^{th}$ power of 2 (i.e. $2^n+1$). The exponent "n" could be to an absolute value of difference between value of first SCS configuration and value of the second SCS configuration.

In one embodiment, slot format values indicated in the slot format combination could be applied to a first BWP and a second BWP. The first (reference) SCS configuration could be for the first BWP, and the second (reference) SCS configuration could be for the second BWP. The number could be associated with a ratio. The ratio could be a reference SCS of the first BWP to a reference SCS of the second BWP. For example, the reference SCS of the first BWP is 30 KHz and the reference SCS of the second BWP is 15 KHz, then, the ratio is 2.

In one embodiment, the ratio could be a reference SCS of the second BWP to a reference SCS of the first BWP. The exponent "n" could be the ratio. The number could be the ratio +1.

In one embodiment, network could indicate a slot format combination by a downlink control information (DCI). The DCI could be DCI format 2_0.

In one embodiment, a slot format indicated by a slot format value could be applied on a (reference) slot, wherein time duration of the (reference) slot is determined based on the first SCS configuration and/or the second SCS configuration. If a slot format combination is used to indicate slot format of paired spectrum, a slot format value applied on a (reference) slot with time duration determined based on the first SCS configuration could be used to indicate slot format of one or more than one slot of DL BWP/spectrum or UL BWP/spectrum. Furthermore, if a slot format combination is used to indicate slot format of paired spectrum, a slot format value applied on a (reference) slot with time duration determined based on the second SCS configuration could be used to indicate slot format of one or more than one slot of UL BWP/spectrum or DL BWP/spectrum. In addition, if a slot format combination is used to indicate slot format of SUL carrier and slot format of non-SUL carrier, a slot format value applied on a (reference) slot with time duration determined based on the first SCS configuration could be used to indicate slot format of one or more than one slot of SUL carrier or non-SUL (UL) carrier. Also, if a slot format combination is used to indicate slot format of paired spectrum, a slot format value applied on a (reference) slot with time duration determined based on the second SCS configuration could be used to indicate slot format of one or more than one slot of non-SUL (UL) carrier or SUL carrier.

In one embodiment, the first SCS configuration could be subcarrierSpacing, and the second SCS configuration could be subcarrierSpacing2. Furthermore, the first SCS configuration could be $\mu_{SFI}$, or $\mu_{SFI,DL}$, or $\mu_{SFI,UL}$, or $\mu_{SFI,SUL}$, and the second SCS configuration could be $\mu_{SFI}$, or $\mu_{SFI,DL}$, or $\mu_{SFI,UL}$, or $\mu_{SFI,SUL}$. For example, assuming the first SCS configuration is $\mu=1$ (i.e. SCS=30 KHz) and the second SCS configuration is $\mu=0$ (i.e. SCS=15 KHz), the number could be 3 (i.e. $2^1+1$ or 30/15+1).

In one embodiment, the rule could be that if value of the first SCS configuration is larger than or equal to value of the second SCS configuration, for each $2^n+1$ slot format values, the first $n^{th}$ power of 2 slot format values could be used for the first SCS configuration and the next or left (one) slot format value could be used for the second SCS configuration. Furthermore, the rule could be that if value of the first SCS configuration is smaller than value of the second SCS configuration, for each $2^n+1$ slot format values, the first one slot format value could be used for the first SCS configuration and the next or left $n^{th}$ power of 2 slot format values could be used for the second SCS configuration.

For example, as shown in FIG. 8, assuming a UE is configured with a serving cell operated with paired spectrum, the UE is configured with a first reference SCS configuration $\mu=1$ (i.e. SCS=30 KHz), and a second reference SCS configuration $\mu=0$ (i.e. SCS=15 KHz), the number could be 3. More specifically, the first reference SCS configuration could indicate slot format of reference slot for downlink BWP/spectrum, and the second reference SCS configuration could indicate slot format of reference slot for uplink BWP/spectrum. In this example, if the UE receives a slot format combination as {1, 2, 4, 5, 10, 15}, the UE may determine for each 3 slot format values. The UE may deem slot format values {1}, {2}, {5}, and {10} indicate slot format of two 30 kHz slot, and slot format values {4} and {15} indicate slot format of one 15 kHz slot.

In a similar example, as shown in FIG. 9, if the UE receives a DCI format 2_0 indicating a slot format combination as {1, 2, 4, 5} which could not be divided by the number, the UE could deem {1}, {2}, {5} for the first three 30 kHz slot and {4} for the first 15 kHz slot. One alternative is that the UE may deem slot format of the fourth 30 kHz slot and slot format of the second 15 kHz slot could be determined based on semi-static configuration. Alternatively, the UE could deem slot format of the fourth 30 kHz slot and slot format of the second 15 kHz slot as that of a slot if not detecting a SFI. Alternatively, the UE could deem slot format of the fourth 30 kHz slot and slot format of the second 15 kHz slot with all symbols as flexible.

In one embodiment, slot format value(s) in a slot format combination shall be applied starting or aligning from a slot in which the UE receives a DCI indicating the slot format combination. For paired spectrum, slot format value applied for slot(s) in DL BWP/spectrum, the UE shall apply the slot format values starting or aligning from beginning of a slot in which the UE receives a DCI indicating the slot format combination. Furthermore, for paired spectrum, for slot format value(s) applied for slot(s) in UL BWP/spectrum, the UE shall apply the slot format values starting from an uplink slot which is aligning from beginning of a slot, where the UE receives a DCI indicating the slot format combination. In addition, for slot format value(s) applied for slot(s) in unpaired spectrum, the UE shall apply the slot format values starting from beginning of a slot, where the UE receives a DCI indicating the slot format combination.

For example, as shown in FIG. 11, assuming SCS of active DL BWP is 60 kHz, SFI monitoring occasion (occasion for indicating a slot format combination) is every 4 60 kHz slots. If a UE performs transmission on a cell operated with paired spectrum, the UE could receive a slot format combination indicating slot format for slot in DL BWP and slot in UL BWP. The UE is configured with a reference SCS for slot format value applied on DL BWP which is assumed as 30 kHz and a reference SCS for slot format value applied on UL BWP which is assumed as 15 kHz. In this example, if a UE receives a slot format combination as {0, 5, 1} in slot #4n, slot format values {0} and {5} could indicate slot format for two 30 kHz slots and slot format {1} could indicate one slot format for one 15 kHz slot. Slot format of a 30 kHz slot could be applied on two consecutive 60 kHz slots in DL BWP. Slot format of a 30 kHz indicated by {0} shall be applied starting from slot #4n in DL BWP. Slot format of a 15 kHz slot could be applied on one 15 kHz slot. Slot format of a 30 kHz indicated by {1} shall be applied starting from slot #n in UL BWP. In this example, first slot format value applied on DL BWP (i.e. slot format value {0}), and first slot format value applied on UL BWP (i.e. slot format value {1}) shall be applied from beginning of a slot where the slot format combination is transmitted.

In one embodiment, the UE may transmit or receive transmission in a serving cell with a paired spectrum. More specifically, the UE may transmit or receive transmission in a serving cell via Frequency-Division Duplexing (FDD). Furthermore, the UE may transmit or receive transmission in a serving cell with an unpaired spectrum. More specifically, the UE may transmit/receive transmission in a serving cell via Time-Division Duplexing (TDD). The UE may be configured with a supplementary uplink (SUL) carrier. All or some of above embodiments can be combined to form a new embodiment.

Figure 12:
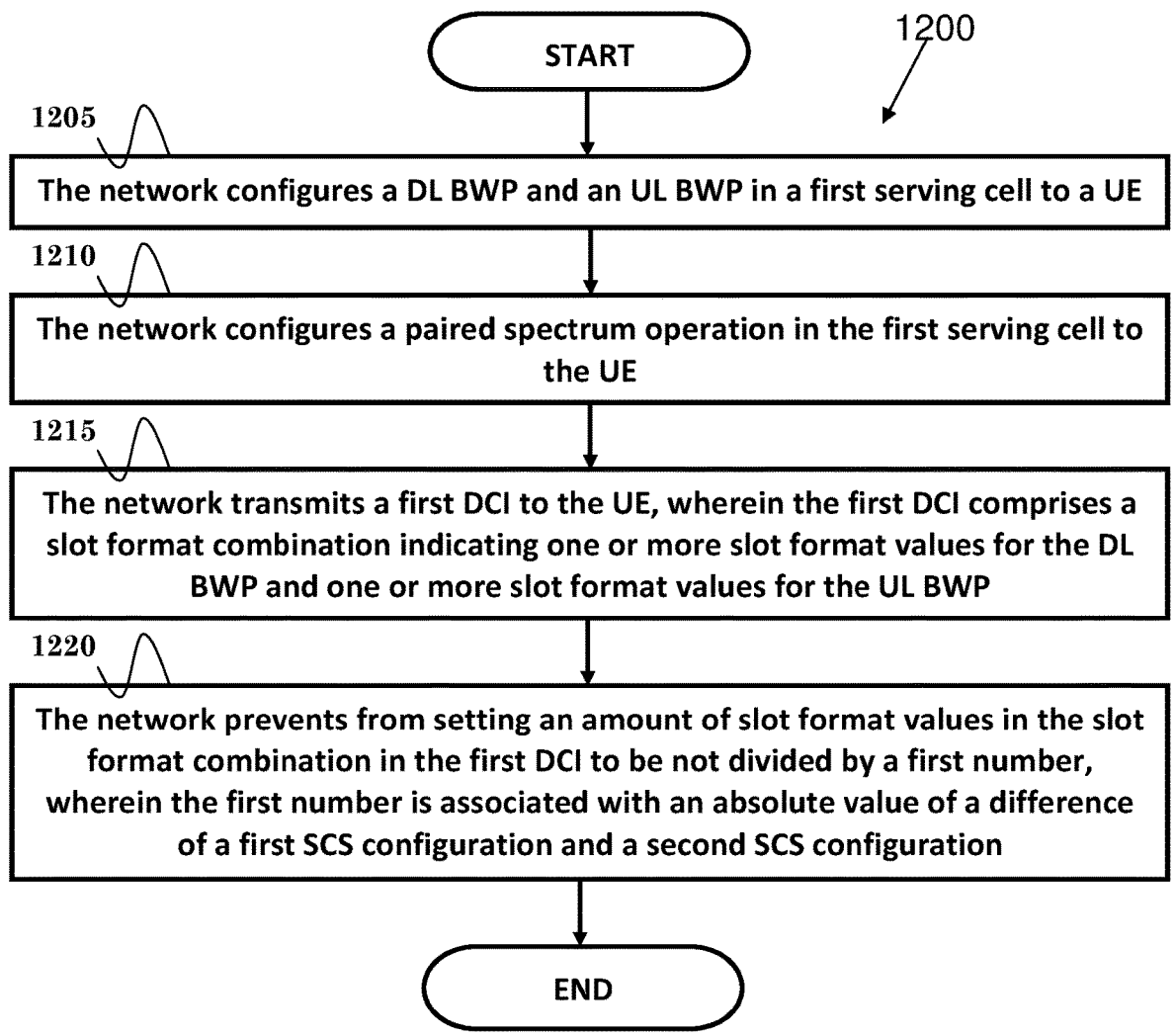
FIG. 12 is a flow chart according to one exemplary embodiment.

FIG. 12 is a flow chart 1200 according to one exemplary embodiment from the perspective of a network. In step 1205, the network configures a DL (Downlink) BWP (Bandwidth Part) and an UL (Uplink) BWP in a first serving cell to a UE (User Equipment). In step 1210, the network configures a paired spectrum operation in the first serving cell to the UE. In step 1215, the network transmits a first DCI (Downlink Control Information) to the UE, wherein the first DCI comprises a slot format combination indicating one or more slot format values for the DL BWP and one or more slot format values for the UL BWP.

In step 1220, the network prevents from setting an amount of slot format values in the slot format combination in the first DCI to be not divided by a first number, wherein the first number is associated with an absolute value of a difference of a first SCS (Subcarrier Spacing) configuration and a second SCS configuration. In one embodiment, the first number could be $N^{th}$ power of 2 plus 1 ($2^N+1$), wherein N is the absolute value of the difference of a first value corresponding to the first SCS configuration and a second value corresponding to the second SCS configuration.

In one embodiment, the network could configure the UE with a first set of slot format combination for the first serving cell. An amount of slot format values of a candidate slot format combination in the first set is not divided by the first number. The first SCS configuration could be used for indicating slot format of one or more slots for the DL BWP, and the second SCS configuration could be used for indicating slot format of one or more slots for the UL BWP.

In one embodiment, the network could configure a first UL carrier and a second UL carrier in a second serving cell to the UE. Furthermore, the network could configure unpaired spectrum operation in the second serving cell to the UE. In addition, the network could transmit a second DCI to the UE, wherein the second DCI comprises a slot format combination indicating one or more slot format values for the first UL carrier and one or more slot format values for the second UL carrier. The network could also prevent from setting an amount of slot format values in the slot format combination in the second DCI to be not divided by a second number, wherein the second number is associated with an absolute value of a difference of a third SCS configuration and a fourth SCS configuration. In one embodiment, the second number could be $M^{th}$ power of 2 plus 1 ($2^M+1$), wherein M is the absolute value of the difference of a third value corresponding to the third SCS configuration and a fourth value corresponding to the fourth SCS configuration.

In one embodiment, the network could configure the UE with a second set of slot format combination for the second serving cell. An amount of slot format values of a candidate slot format combination in the second set is not divided by the second number. The third SCS configuration could be used for indicating slot format of one or more slots for the first UL carrier, and the fourth SCS configuration could be used for indicating slot format of one or more slots for the second UL carrier.

Referring back to FIGS. 3 and 4, in one exemplary embodiment of a network, the device 300 includes a program code 312 stored in the memory 310. The CPU 308 could execute program code 312 to enable the network (i) to configure a DL BWP and an UL BWP in a first serving cell to a UE, (ii) to configure a paired spectrum operation in the first serving cell to the UE, (iii) to transmit a first DCI to the UE, wherein the first DCI comprises a slot format combination indicating one or more slot format values for the DL BWP and one or more slot format values for the UL BWP, and (iv) to prevent from setting an amount of slot format values in the slot format combination in the first DCI to be not divided by a first number, wherein the first number is associated with an absolute value of a difference of a first SCS configuration and a second SCS configuration. Furthermore, the CPU 308 can execute the program code 312 to perform all of the above-described actions and steps or others described herein.

Figure 13:
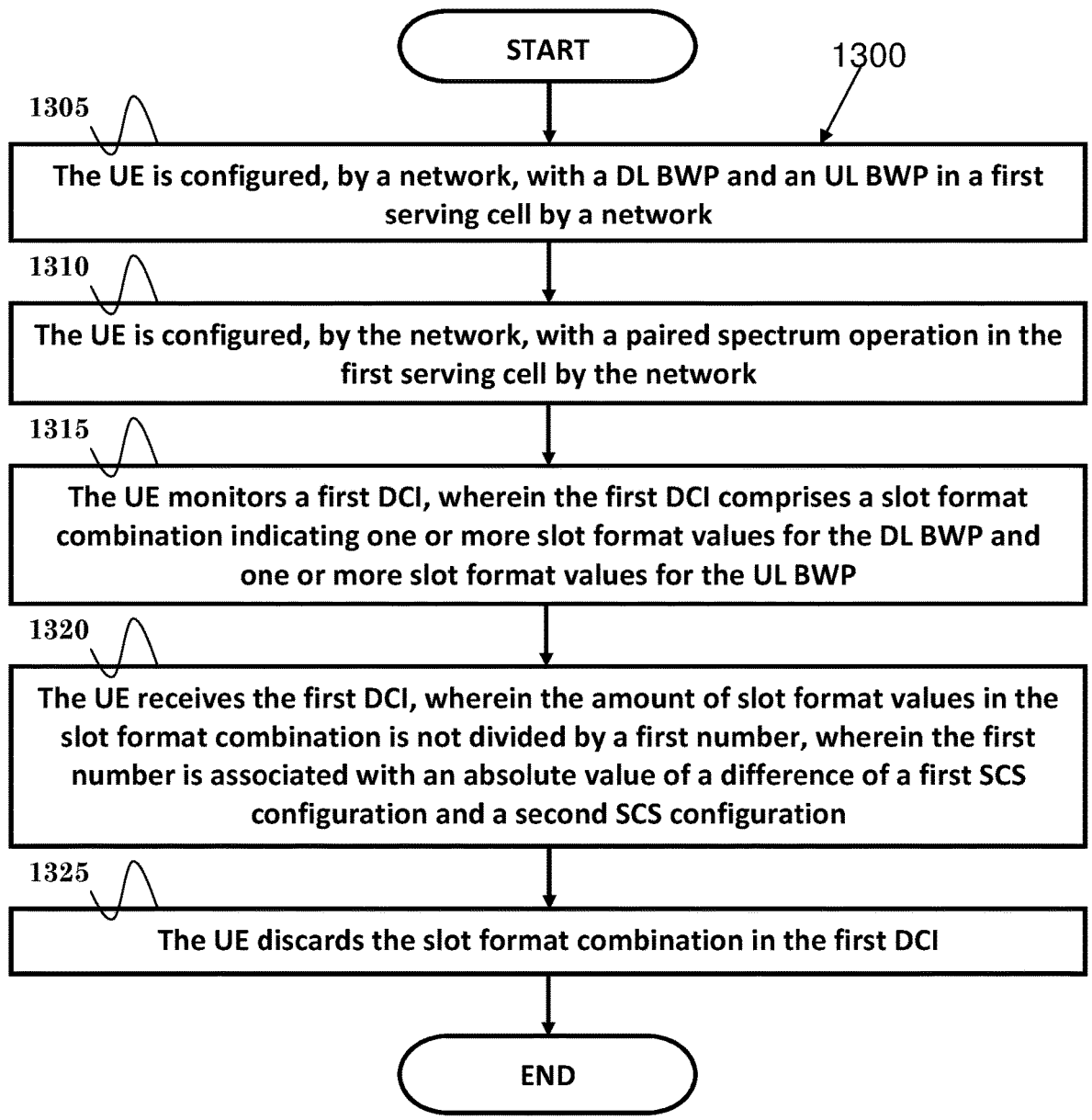
FIG. 13 is a flow chart according to one exemplary embodiment.

FIG. 13 is a flow chart 1300 according to one exemplary embodiment from the perspective of a UE. In step 1305, the UE is configured, by a network, with a DL (Downlink) BWP (Bandwidth Part) and an UL (Uplink) BWP in a first serving cell. In step 1310, the UE is configured, by the network, with a paired spectrum operation in the first serving cell. In step 1315, the UE monitors a first DCI (Downlink Control Information), wherein the first DCI comprises a slot format combination indicating one or more slot format values for the DL BWP and one or more slot format values for the UL BWP.

In step 1320, the UE receives the first DCI, wherein the amount of slot format values in the slot format combination is not divided by a first number, wherein the first number is associated with an absolute value of a difference of a first SCS configuration and a second SCS configuration. In one embodiment, the first number is $N^{th}$ power of 2 plus 1 ($2^N+1$), wherein N is the absolute value of the difference of a first value corresponding to the first SCS configuration and a second value corresponding to the second SCS configuration. The first SCS configuration could be used for indicating slot format of one or more slots for the DL BWP, and the second SCS configuration could be used for indicating slot format of one or more slots for the UL BWP.

In step 1325, the UE discards the slot format combination in the first DCI. In one embodiment, the UE may not apply the slot format combination in the first DCI.

In one embodiment, the UE could be configured, by a network, with a first UL carrier and a second UL carrier in a second serving cell. Furthermore, the UE could be configured, by the network, with an unpaired spectrum operation in the second serving cell. In addition, the UE could monitor a second DCI, wherein the second DCI comprises a slot format combination indicating one or more slot format values for the first UL carrier and one or more slot format values for the second UL carrier. Also, the UE could receive the second DCI, wherein an amount of slot format values in the slot format combination is not divided by a second number, wherein the second number is associated with absolute value of difference of a third SCS configuration and a fourth SCS configuration. In addition, the UE could discard the slot format combination in the second DCI.

In one embodiment, the second number is $M^{th}$ power of 2 plus 1 ($2^M+1$), wherein M is the absolute value of the difference of a third value corresponding to the third SCS configuration and a fourth value corresponding to the fourth SCS configuration. The third SCS configuration could be used for indicating slot format of one or more slots for the first UL carrier, and the fourth SCS configuration could be used for indicating slot format of one or more slots for the second UL carrier. The UE may not apply the slot format combination in the second DCI.

Referring back to FIGS. 3 and 4, in one exemplary embodiment of a UE, the device 300 includes a program code 312 stored in the memory 310. The CPU 308 could execute program code 312 to enable the UE (i) to be configured, by a network, with a DL BWP and an UL BWP in a first serving cell, (ii) to be configured, by the network, with a paired spectrum operation in the first serving cell, (iii) to monitor a first DCI, wherein the first DCI comprises a slot format combination indicating one or more slot format values for the DL BWP and one or more slot format values for the UL BWP, (iv) to receive the first DCI, wherein the amount of slot format values in the slot format combination is not divided by a first number, wherein the first number is associated with an absolute value of a difference of a first SCS configuration and a second SCS configuration, and (v) to discard the slot format combination in the first DCI. Furthermore, the CPU 308 can execute the program code 312 to perform all of the above-described actions and steps or others described herein.

Figure 14:
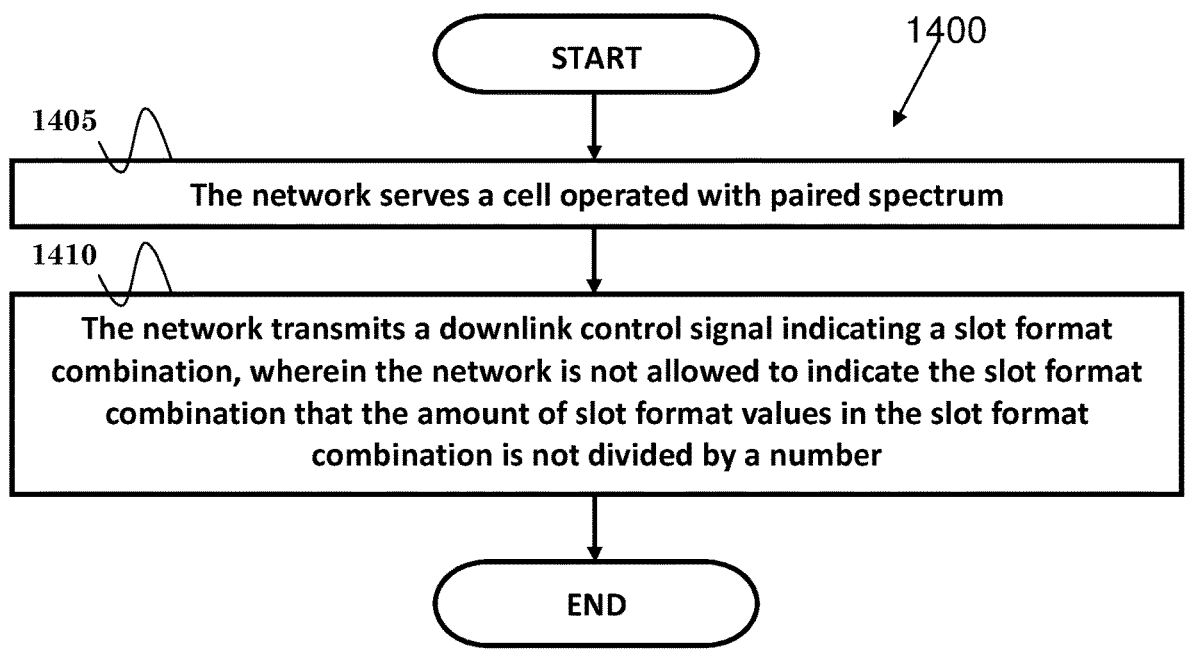
FIG. 14 is a flow chart according to one exemplary embodiment.

FIG. 14 is a flow chart 1400 according to one exemplary embodiment from the perspective of a network. In step 1405, the network serves a cell operated with paired spectrum. In step 1410, the network transmits a downlink control signal indicating a slot format combination, wherein the network is not allowed to indicate the slot format combination that the amount of slot format values in the slot format combination is not divided by a number.

Referring back to FIGS. 3 and 4, in one exemplary embodiment of a network, the device 300 includes a program code 312 stored in the memory 310. The CPU 308 could execute program code 312 to enable the network (i) to serve a cell operated with paired spectrum, and (ii) to transmit a downlink control signal indicating a slot format combination, wherein the network is not allowed to indicate the slot format combination that the amount of slot format values in the slot format combination is not divided by a number. Furthermore, the CPU 308 can execute the program code 312 to perform all of the above-described actions and steps or others described herein.

Figure 15:
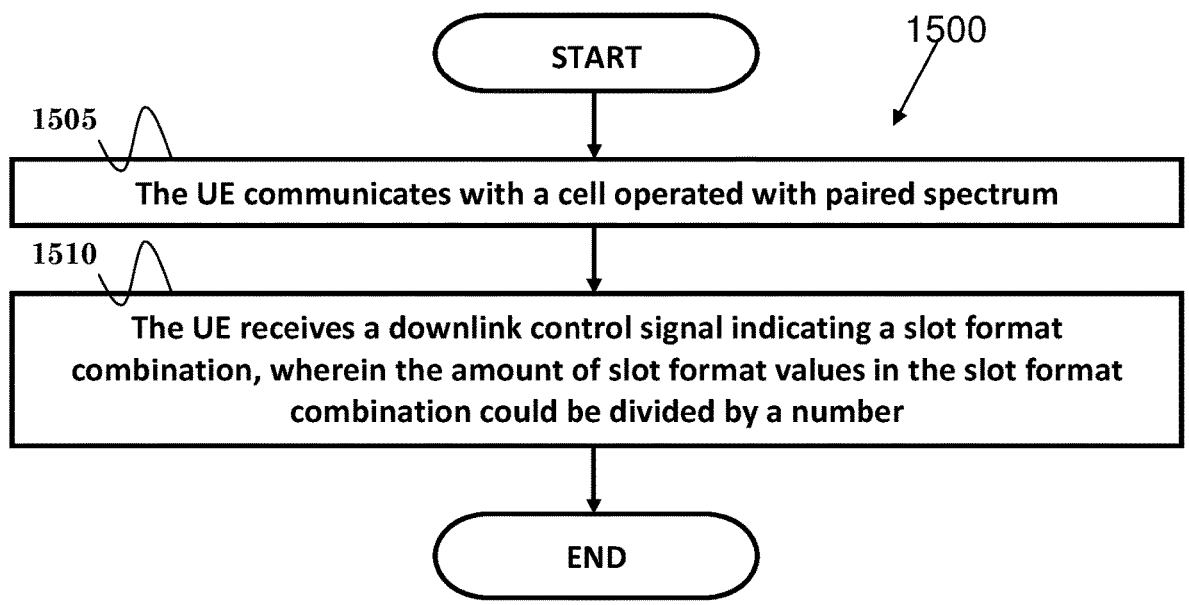
FIG. 15 is a flow chart according to one exemplary embodiment.

FIG. 15 is a flow chart 1500 according to one exemplary embodiment from the perspective of a UE. In step 1505, the UE communicates with a cell operated with paired spectrum. In step 1510, the UE receives a downlink control signal indicating a slot format combination, wherein the amount of slot format values in the slot format combination could be divided by a number.

Referring back to FIGS. 3 and 4, in one exemplary embodiment of a UE, the device 300 includes a program code 312 stored in the memory 310. The CPU 308 could execute program code 312 to enable the UE (i) to communicate with a cell operated with paired spectrum, and (ii) to receive a downlink control signal indicating a slot format combination, wherein the amount of slot format values in the slot format combination could be divided by a number. Furthermore, the CPU 308 can execute the program code 312 to perform all of the above-described actions and steps or others described herein.

In the context of the embodiments illustrated in FIGS. 14 and 15 and described above, in one embodiment, the UE may not expect to receive a slot format combination that the amount of slot format values in the slot format combination could not be divided by the number. The number could be determined based on a first subcarrier spacing (SCS) configuration and a second SCS configuration. The number could be $N^{th}$ power of 2 plus 1, wherein N is the absolute value of the difference of the first SCS configuration and the second SCS configuration.

In one embodiment, the slot format combination could indicate slot format for a first BWP and a second BWP. The (reference) first SCS configuration could be for the first BWP, and the (reference) second SCS configuration could be for the second BWP.

In one embodiment, the number could be associated with a ratio. The ratio could be a reference SCS of the first BWP to a reference SCS of the second BWP, or a reference SCS of the second BWP to a reference SCS of the first BWP. The number could be the ratio +1.

In one embodiment, the network could indicate slot format of a slot based on the first SCS configuration and/or the second SCS configuration and/or the slot format combination. The UE could interpret a slot format in the slot format combination based on the first SCS configuration and/or the second SCS configuration. A slot format value could indicate slot format of a slot, wherein time duration of the slot is determined based on the first SCS configuration and/or the second SCS configuration. A slot format value could also indicate transmitted direction or state or functionality of each OFDM symbol of a slot.

In one embodiment, the transmitted direction or state or functionality of an OFDM symbol could be downlink, uplink, or flexible. The transmitted direction or state or functionality of an OFDM symbol for downlink bandwidth part (BWP) or spectrum could be downlink or flexible. The transmitted direction or state or functionality of an OFDM symbol for uplink bandwidth part (BWP) or spectrum could be uplink or flexible.

In one embodiment, the network could use the first SCS configuration to interpret a slot format value, wherein the slot format value indicates slot format of a downlink slot or an uplink slot. The network could also use the second SCS configuration to interpret a slot format value, wherein the slot format value indicates slot format of an uplink slot or a downlink slot.

In one embodiment, the UE could use the first SCS configuration to interpret a slot format value, wherein the slot format value indicates slot format of a downlink slot or an uplink slot. The UE could also use the second SCS configuration to interpret a slot format value, wherein the slot format value indicates slot format of an uplink slot or a downlink slot.

In one embodiment, the slot format values in the slot format combination could be divided (equally) into multiple groups from the first slot format value, wherein cardinality of each group is the number. If value of the first SCS configuration is larger than or equal to value of the second SCS configuration, for each $2^n+1$ slot format values, the first $n^{th}$ power of 2 slot format values could be used for the first SCS configuration and the next or left (one) slot format value could be used for the second SCS configuration. If value of the first SCS configuration is smaller than value of the second SCS configuration, for each $2^n+1$ slot format values, the first one slot format value could be used for the first SCS configuration and the next or left $n^{th}$ power of 2 slot format values could be used for the second SCS configuration.

Figure 16:
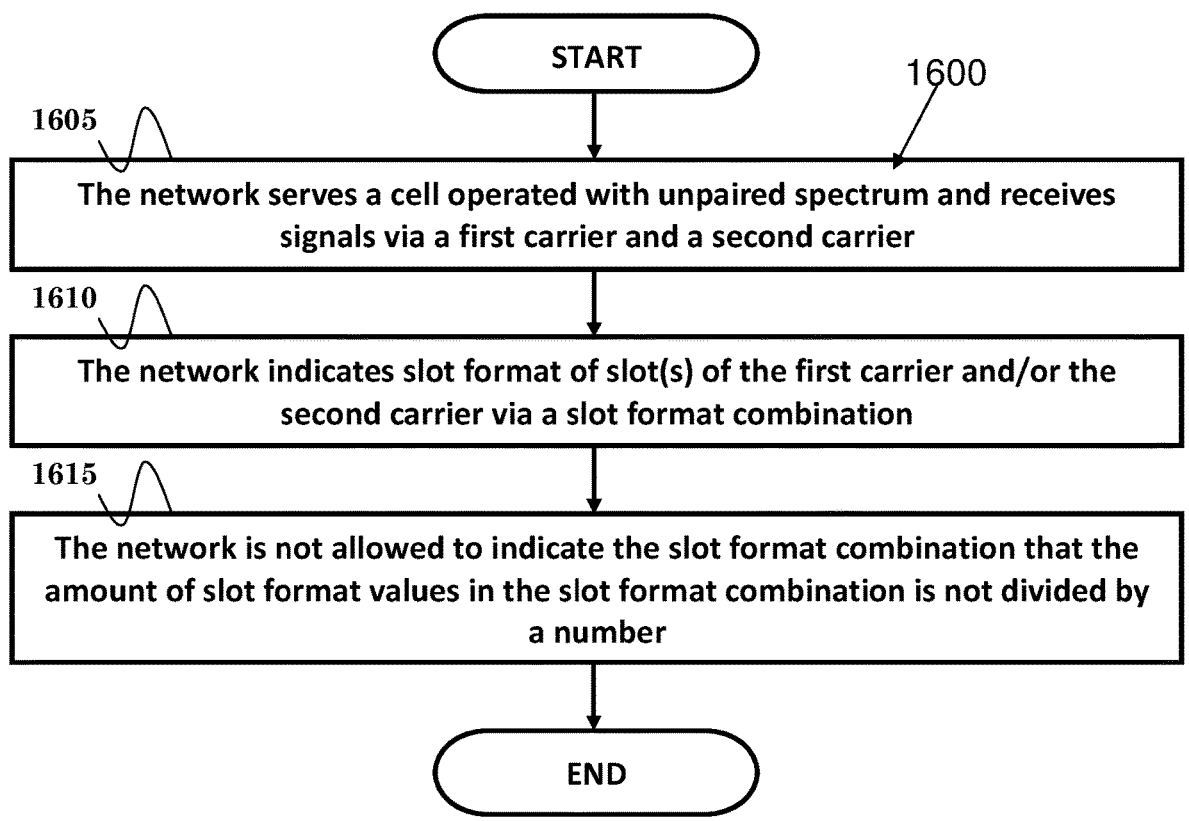
FIG. 16 is a flow chart according to one exemplary embodiment.

FIG. 16 is a flow chart 1600 according to one exemplary embodiment from the perspective of a network. In step 1605, the network serves a cell operated with unpaired spectrum and receives signals via a first carrier and a second carrier. In step 1610, the network indicates slot format of slot(s) of the first carrier and/or the second carrier via a slot format combination. In step 1615, the network is not allowed to indicate the slot format combination that the amount of slot format values in the slot format combination is not divided by a number.

Referring back to FIGS. 3 and 4, in one exemplary embodiment of a network, the device 300 includes a program code 312 stored in the memory 310. The CPU 308 could execute program code 312 to enable the network (i) to serve a cell operated with unpaired spectrum and receives signals via a first carrier and a second carrier, (ii) to indicate slot format of slot(s) of the first carrier and/or the second carrier via a slot format combination, and (iii) to not be allowed to indicate the slot format combination that the amount of slot format values in the slot format combination is not divided by a number. Furthermore, the CPU 308 can execute the program code 312 to perform all of the above-described actions and steps or others described herein.

Figure 17:
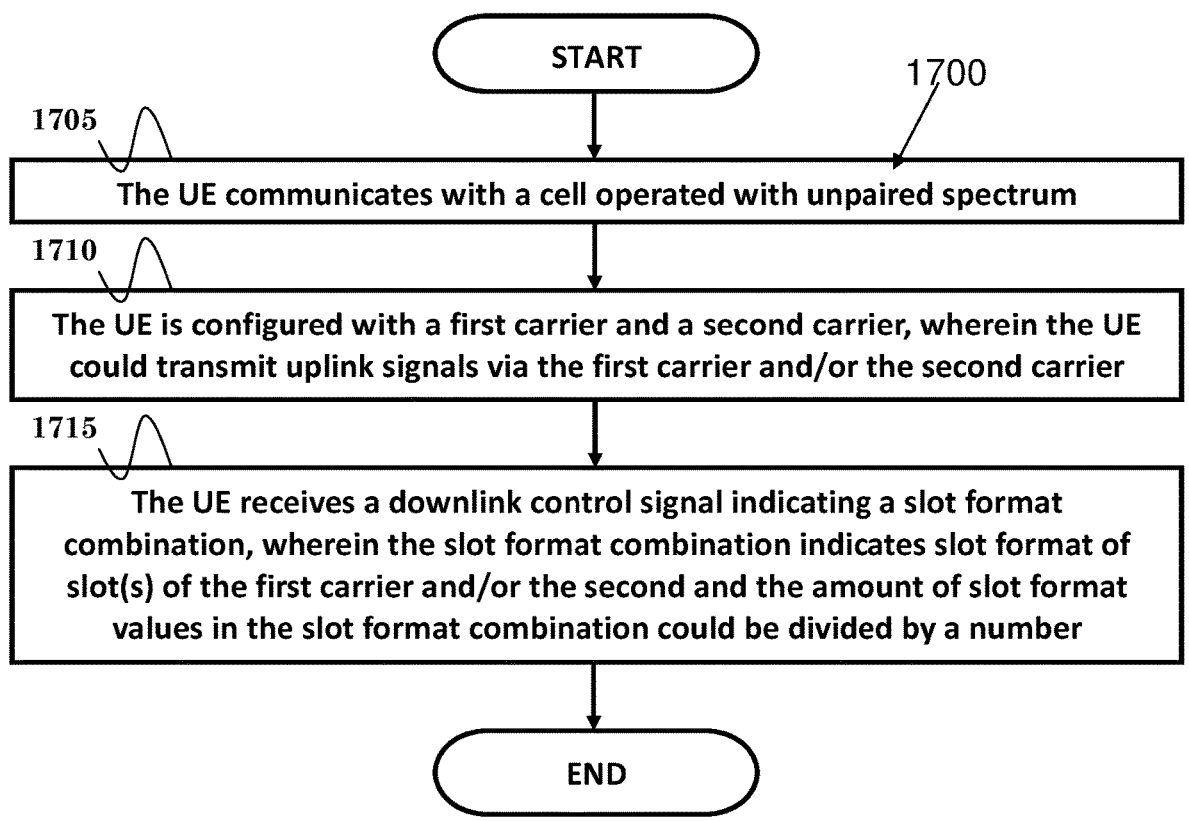
FIG. 17 is a flow chart according to one exemplary embodiment.

FIG. 17 is a flow chart 1700 according to one exemplary embodiment from the perspective of a UE. In step 1705, the UE communicates with a cell operated with unpaired spectrum. In step 1710, the UE is configured with a first carrier and a second carrier, wherein the UE could transmit uplink signals via the first carrier and/or the second carrier. In step 1715, the UE receives a downlink control signal indicating a slot format combination, wherein the slot format combination indicates slot format of slot(s) of the first carrier and/or the second and the amount of slot format values in the slot format combination could be divided by a number.

Referring back to FIGS. 3 and 4, in one exemplary embodiment of a UE, the device 300 includes a program code 312 stored in the memory 310. The CPU 308 could execute program code 312 to enable the UE (i) to communicate with a cell operated with unpaired spectrum, (ii) to be configured with a first carrier and a second carrier, wherein the UE could transmit uplink signals via the first carrier and/or the second carrier, and (iii) to receives a downlink control signal indicating a slot format combination, wherein the slot format combination indicates slot format of slot(s) of the first carrier and/or the second and the amount of slot format values in the slot format combination could be divided by a number. Furthermore, the CPU 308 can execute the program code 312 to perform all of the above-described actions and steps or others described herein.

In the context of the embodiments illustrated in FIGS. 16 and 17 and described above, in one embodiment, the UE may not expect to receive a slot format combination that the amount of slot format values in the slot format combination could not be divided by the number. The number could be determined based on a first subcarrier spacing (SCS) configuration and a second SCS configuration. The number could be $N^{th}$ power of 2 plus 1, wherein N is the absolute value of the difference of the first SCS configuration and the second SCS configuration.

In one embodiment, the slot format combination could indicate slot format for a first BWP and a second BWP. The (reference) first SCS configuration could be for the first BWP, and the (reference) second SCS configuration could be for the second BWP.

In one embodiment, the number could be associated with a ratio. The ratio could be a reference SCS of the first BWP to a reference SCS of the second BWP, or a reference SCS of the second BWP to a reference SCS of the first BWP. The number could be the ratio +1.

In one embodiment, the network could indicate slot format of a slot based on the first SCS configuration, the second SCS configuration, and/or the slot format combination. The UE could interpret a slot format in the slot format combination based on the first SCS configuration and/or the second SCS configuration.

In one embodiment, a slot format value could indicate slot format of a slot, wherein time duration of the slot is determined based on the first SCS configuration and/or the second SCS configuration. A slot format value indicates transmitted direction or state or functionality of each OFDM symbol of a slot. The transmitted direction or state or functionality of an OFDM symbol could be downlink or uplink or flexible. The transmitted direction or state or functionality of an OFDM symbol for the first carrier and/or the second carrier could also be uplink or flexible.

In one embodiment, the network could use the first SCS configuration to interpret a slot format value, wherein the slot format value indicates slot format of slot(s) of the first carrier and/or the second carrier. The network could also use the second SCS configuration to interpret a slot format value, wherein the slot format value indicates slot format of slot(s) of the first carrier and/or the second carrier. The UE could use the first SCS configuration to interpret a slot format value, wherein the slot format value indicates slot format of slot(s) of the first carrier and/or the second carrier. The UE could also use the second SCS configuration to interpret a slot format value, wherein the slot format value indicates slot format of slot(s) of the first carrier and/or the second carrier.

In one embodiment, the slot format values in the slot format combination could be divided (equally) into multiple groups from the first slot format value, wherein cardinality of each group is the number. If value of the first SCS configuration is larger than or equal to value of the second SCS configuration, for each $2^n+1$ slot format values, the first $n^{th}$ power of 2 slot format values could be used for the first SCS configuration and the next/left (one) slot format value could be used for the second SCS configuration. If value of the first SCS configuration is smaller than value of the second SCS configuration, for each $2^n+1$ slot format values, the first one slot format value could be used for the first SCS configuration and the next/left $n^{th}$ power of 2 slot format values could be used for the second SCS configuration.

Figure 18:
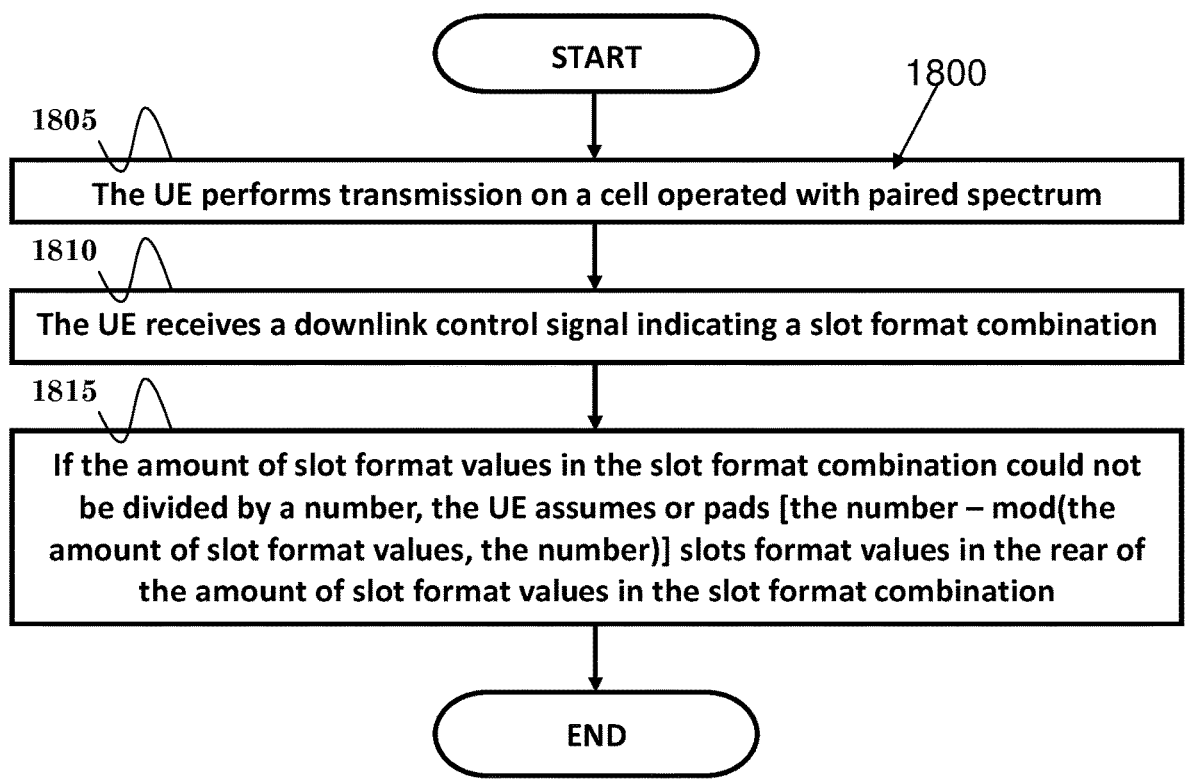
FIG. 18 is a flow chart according to one exemplary embodiment.

FIG. 18 is a flow chart 1800 according to one exemplary embodiment from the perspective of a UE. In step 1805, the UE performs transmission on a cell operated with paired spectrum. In step 1810, the UE receives a downlink control signal indicating a slot format combination. In step 1815, if the amount of slot format values in the slot format combination could not be divided by a number, the UE assumes or pads [the number−mod(the amount of slot format values, the number)] slots format values in the rear of the amount of slot format values in the slot format combination.

In one embodiment, [the number−mod(the amount of slot format values, the number)] slots format values could be a particular slot format value. Alternatively, [the number−mod (the amount of slot format values, the number)] slots format values could be an empty and/or blank slot format value.

In one embodiment, the number could be determined based on a first subcarrier spacing (SCS) configuration and a second SCS configuration. The number could be $n^{th}$ power of 2 plus 1, wherein n is the absolute value of the difference of the first SCS configuration and the second SCS configuration.

In one embodiment, the slot format combination could indicate slot format for a first BWP and a second BWP. The number could be associated with a ratio. The ratio could be a reference SCS of the first BWP to a reference SCS of the second BWP, or a reference SCS of the second BWP to a reference SCS of the first BWP. The number could be the ratio +1.

In one embodiment, the UE could interpret a slot format in the slot format combination based on the first SCS configuration and/or the second SCS configuration. A slot format value could indicate slot format of a slot, wherein time duration of the slot is determined based on the first SCS configuration and/or the second SCS configuration. A slot format value could also indicated transmitted direction or state or functionality of each OFDM symbol of a slot. The transmitted direction or state or functionality of an OFDM symbol could be downlink or uplink or flexible. The transmitted direction or state or functionality of an OFDM symbol for downlink bandwidth part (BWP)/spectrum could also be downlink or flexible. Alternatively, the transmitted direction or state or functionality of an OFDM symbol for uplink bandwidth part (BWP)/spectrum could be uplink or flexible.

In one embodiment, the UE could use the first SCS configuration to interpret a slot format value, wherein the slot format value indicates slot format of a downlink slot or an uplink slot. The UE could also use the second SCS configuration to interpret a slot format value, wherein the slot format value indicates slot format of an uplink slot or a downlink slot.

In one embodiment, the slot format values and the one or more empty and/or blank slot format values in the slot format combination could be divided (equally) into multiple groups from the first slot format value, wherein cardinality of each group is the number. If value of the first SCS configuration is larger than or equal to value of the second SCS configuration, for each $2^n+1$ slot format values, the first $n^{th}$ power of 2 slot format values could be used for the first SCS configuration and the next/left (one) slot format value could be used for the second SCS configuration. Also, if value of the first SCS configuration is smaller than value of the second SCS configuration, for each $2^n+1$ slot format values, the first one slot format value could be used for the first SCS configuration and the next/left $n^{th}$ power of 2 slot format values could be used for the second SCS configuration.

In one embodiment, for slot format of slot(s) indicated by the one or more empty and/or blank slot format values, the UE could assume that slot format of the slot(s) is not indicated/covered by the downlink control signal. For slot format of slot(s) indicated by the one or more than one empty and/or blank slot format values, the UE could assume that slot format of the slot(s) is determined based on semi-static configuration. The semi-static configuration could be "flexible".

Referring back to FIGS. 3 and 4, in one exemplary embodiment of a UE, the device 300 includes a program code 312 stored in the memory 310. The CPU 308 could execute program code 312 to enable the UE (i) to perform transmission on a cell operated with paired spectrum, (ii) to receive a downlink control signal indicating a slot format combination, and (iii) to assume or pad [the number−mod(the amount of slot format values, the number)] slots format values in the rear of the amount of slot format values in the slot format combination if the amount of slot format values in the slot format combination could not be divided by a number. Furthermore, the CPU 308 can execute the program code 312 to perform all of the above-described actions and steps or others described herein.

Figure 19:
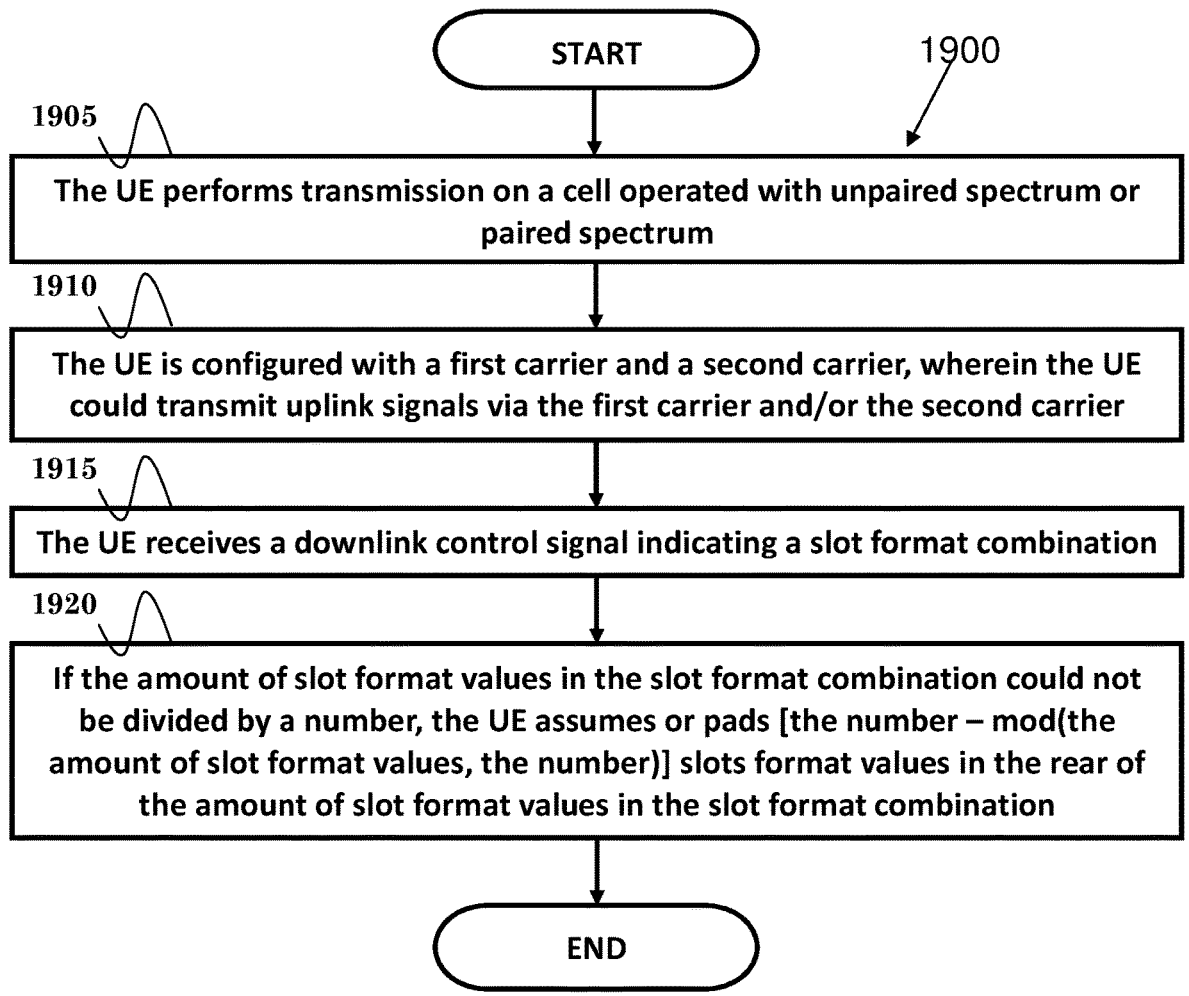
FIG. 19 is a flow chart according to one exemplary embodiment.

FIG. 19 is a flow chart 1900 according to one exemplary embodiment from the perspective of a UE. In step 1905, the UE performs transmission on a cell operated with unpaired spectrum or paired spectrum. In step 1910, the UE is configured with a first carrier and a second carrier, wherein the UE could transmit uplink signals via the first carrier and/or the second carrier. In step 1915, the UE receives a downlink control signal indicating a slot format combination.

In step 1920, if the amount of slot format values in the slot format combination could not be divided by a number, the UE assumes or pads [the number−mod(the amount of slot format values, the number)] slots format values in the rear of the amount of slot format values in the slot format combination. In one embodiment, [the number−mod(the amount of slot format values, the number)] slots format values could be particular slot format value. Alternatively, [the number−mod(the amount of slot format values, the number)] slots format values could be an empty and/or blank slot format value.

In one embodiment, the number could be determined based on a first subcarrier spacing (SCS) configuration and a second SCS configuration. The number is $n^{th}$ power of 2 plus 1, wherein n is absolute value of difference of the first SCS configuration and the second SCS configuration.

In one embodiment, the slot format combination could indicate slot format for a first BWP and a second BWP. The (reference) first SCS configuration could be for the first BWP, and the (reference) second SCS configuration could be for the second BWP.

In one embodiment, the number could be associated with a ratio. The ratio could be a reference SCS of the first BWP to a reference SCS of the second BWP, or a reference SCS of the second BWP to a reference SCS of the first BWP. The number could be the ratio +1.

In one embodiment, the UE could interpret a slot format in the slot format combination based on the first SCS configuration and/or the second SCS configuration. A slot format value could indicate slot format of a slot, wherein time duration of the slot is determined based on the first SCS configuration and/or the second SCS configuration. A slot format value could also indicate transmitted direction or state or functionality of each OFDM symbol of a slot. The transmitted direction or state or functionality of an OFDM symbol could be downlink or uplink or flexible. The transmitted direction or state or functionality of an OFDM symbol for the first carrier and/or the second carrier could also be uplink or flexible.

In one embodiment, the UE could use the first SCS configuration to interpret a slot format value, wherein the slot format value indicates slot format of slot(s) of the first carrier and/or the second carrier. The UE could also use the second SCS configuration to interpret a slot format value, wherein the slot format value indicates slot format of slot(s) of the first carrier and/or the second carrier.

In one embodiment, the slot format values and the one or more empty and/or blank slot format values in the slot format combination could be divided (equally) into multiple groups from the first slot format value, wherein cardinality of each group is the number. If value of the first SCS configuration is larger than or equal to value of the second SCS configuration, for each $2^n+1$ slot format values, the first $n^{th}$ power of 2 slot format values could be used for the first SCS configuration and the next/left (one) slot format value could be used for the second SCS configuration. Furthermore, if value of the first SCS configuration is smaller than value of the second SCS configuration, for each $2^n+1$ slot format values, the first one slot format value could be used for the first SCS configuration and the next/left $n^{th}$ power of 2 slot format values could be used for the second SCS configuration.

In one embodiment, for slot format of slot(s) indicated by the one or more than one empty and/or blank slot format values, the UE could assume that slot format of the slot(s) is not indicated or covered by the downlink control signal. Alternatively, for slot format of slot(s) indicated by the one or more than one empty slot format values, the UE could assume that slot format of the slot(s) is determined based on semi-static configuration. The semi-static configuration could be tdd-UL-DL-ConfigurationCommon, tdd-UL-DL-ConfigurationCommon2, and/or tdd-UL-DL-ConfigDedicated. The semi-static configuration could also be "flexible".

Referring back to FIGS. 3 and 4, in one exemplary embodiment of a UE, the device 300 includes a program code 312 stored in the memory 310. The CPU 308 could execute program code 312 to enable the UE (i) to perform transmission on a cell operated with unpaired spectrum or paired spectrum, (ii) to be configured with a first carrier and a second carrier, wherein the UE could transmit uplink signals via the first carrier and/or the second carrier, (iii) to receive a downlink control signal indicating a slot format combination, and (iv) to assume or pad [the number−mod (the amount of slot format values, the number)] slots format values in the rear of the amount of slot format values in the slot format combination if the amount of slot format values in the slot format combination could not be divided by a number. Furthermore, the CPU 308 can execute the program code 312 to perform all of the above-described actions and steps or others described herein.

Various aspects of the disclosure have been described above. It should be apparent that the teachings herein could be embodied in a wide variety of forms and that any specific structure, function, or both being disclosed herein is merely representative. Based on the teachings herein one skilled in the art should appreciate that an aspect disclosed herein could be implemented independently of any other aspects and that two or more of these aspects could be combined in various ways. For example, an apparatus could be implemented or a method could be practiced using any number of the aspects set forth herein. In addition, such an apparatus could be implemented or such a method could be practiced using other structure, functionality, or structure and functionality in addition to or other than one or more of the aspects set forth herein. As an example of some of the above concepts, in some aspects concurrent channels could be established based on pulse repetition frequencies. In some aspects concurrent channels could be established based on pulse position or offsets. In some aspects concurrent channels could be established based on time hopping sequences. In some aspects concurrent channels could be established based on pulse repetition frequencies, pulse positions or offsets, and time hopping sequences.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, processors, means, circuits, and algorithm steps described in connection with the aspects disclosed herein may be implemented as electronic hardware (e.g., a digital implementation, an analog implementation, or a combination of the two, which may be designed using source coding or some other technique), various forms of program or design code incorporating instructions (which may be referred to herein, for convenience, as "software" or a "software module"), or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

In addition, the various illustrative logical blocks, modules, and circuits described in connection with the aspects disclosed herein may be implemented within or performed by an integrated circuit ("IC"), an access terminal, or an access point. The IC may comprise a general purpose processor, a digital signal processor (DSP), an application specific integrated circuit (ASIC), a field programmable gate array (FPGA) or other programmable logic device, discrete gate or transistor logic, discrete hardware components, electrical components, optical components, mechanical components, or any combination thereof designed to perform the functions described herein, and may execute codes or instructions that reside within the IC, outside of the IC, or both. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

It is understood that any specific order or hierarchy of steps in any disclosed process is an example of a sample approach. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

The steps of a method or algorithm described in connection with the aspects disclosed herein may be embodied directly in hardware, in a software module executed by a processor, or in a combination of the two. A software module (e.g., including executable instructions and related data) and other data may reside in a data memory such as RAM memory, flash memory, ROM memory, EPROM memory, EEPROM memory, registers, a hard disk, a removable disk, a CD-ROM, or any other form of computer-readable storage medium known in the art. A sample storage medium may be coupled to a machine such as, for example, a computer/processor (which may be referred to herein, for convenience, as a "processor") such the processor can read information (e.g., code) from and write information to the storage medium. A sample storage medium may be integral to the processor. The processor and the storage medium may reside in an ASIC. The ASIC may reside in user equipment. In the alternative, the processor and the storage medium may reside as discrete components in user equipment. Moreover, in some aspects any suitable computer-program product may comprise a computer-readable medium comprising codes relating to one or more of the aspects of the disclosure. In some aspects a computer program product may comprise packaging materials.

While the invention has been described in connection with various aspects, it will be understood that the invention is capable of further modifications. This application is intended to cover any variations, uses or adaptation of the invention following, in general, the principles of the invention, and including such departures from the present disclosure as come within the known and customary practice within the art to which the invention pertains.

The invention claimed is:

1. A method for a network, comprising:
   the network configures a DL (Downlink) BWP (Bandwidth Part) and an UL (Uplink) BWP in a first serving cell to a UE (User Equipment);
   the network configures a paired spectrum operation in the first serving cell to the UE;
   the network configures an amount of slot format values in a slot format combination, wherein the configuring the amount of slot format values is based upon a determination, by the network, that the amount of slot format values is divisible by a first number corresponding to $N^{th}$ power of 2 plus 1 ($2^N+1$), and wherein N is an absolute value of a difference between a first SCS (Subcarrier Spacing) configuration and a second SCS configuration;
   the network transmits a first DCI (Downlink Control Information) to the UE, wherein the first DCI comprises the slot format combination indicating one or more slot format values for the DL BWP and one or more slot format values for the UL BWP;
   the network configures a first UL carrier and a second UL carrier in a second serving cell to the UE;
   the network configures an unpaired spectrum operation in the second serving cell to the UE;
   the network configures a second amount of slot format values in a second slot format combination, wherein the configuring the second amount of slot format values is based upon a determination that the second amount of slot format values is divisible by a second number corresponding to an absolute value of a difference of a third SCS configuration and a fourth SCS configuration; and
   the network transmits a second DCI to the UE, wherein the second DCI comprises the second slot format combination indicating one or more slot format values for the first UL carrier and one or more slot format values for the second UL carrier.

2. The method of claim 1, wherein the network configures the UE with a first set of slot format combinations for the first serving cell.

3. The method of claim 2, wherein an amount of slot format values of a candidate slot format combination in the first set of slot format combinations is not divided by the first number.

4. The method of claim 1, wherein the first SCS configuration is used for indicating slot format of one or more slots for the DL BWP, and the second SCS configuration is used for indicating slot format of one or more slots for the UL BWP.

5. The method of claim 1, wherein the second number is $M^{th}$ power of 2 plus 1 ($2^M+1$), wherein M is the absolute value of the difference of a third value corresponding to the third SCS configuration and a fourth value corresponding to the fourth SCS configuration.

6. The method of claim 1, wherein the network configures the UE with a second set of slot format combinations for the second serving cell.

7. The method of claim 6, wherein an amount of slot format values of a candidate slot format combination in the second set of slot format combinations is not divided by the second number.

8. The method of claim 1, wherein the third SCS configuration is used for indicating slot format of one or more slots for the first UL carrier, and the fourth SCS configuration is used for indicating slot format of one or more slots for the second UL carrier.

9. A method for a UE (User Equipment), comprising:
   the UE is configured, by a network, with a DL (Downlink) BWP (Bandwidth Part) and an UL (Uplink) BWP in a first serving cell;
   the UE is configured, by the network, with a paired spectrum operation in the first serving cell;
   the UE monitors a first DCI (Downlink Control Information), wherein the first DCI comprises a slot format combination indicating one or more slot format values for the DL BWP and one or more slot format values for the UL BWP;
   the UE receives the first DCI, wherein an amount of slot format values in the slot format combination is not divided by a first number, wherein the first number is associated with $N^{th}$ power of 2 plus 1 ($2^N+1$), and wherein N is an absolute value of a difference of a first SCS (Subcarrier Spacing) configuration and a second SCS configuration;
   based upon the slot format combination not being divided by the first number, the UE discards the slot format combination in the first DCI;
   the UE is configured, by the network, with a first UL carrier and a second UL carrier in a second serving cell;
   the UE is configured, by the network, with an unpaired spectrum operation in the second serving cell;
   the UE monitors a second DCI, wherein the second DCI comprises a second slot format combination indicating one or more slot format values for the first UL carrier and one or more slot format values for the second UL carrier;
   the UE receives the second DCI, wherein an amount of slot format values in the second slot format combination is not divided by a second number, wherein the second number is associated with absolute value of difference of a third SCS configuration and a fourth SCS configuration; and
   based upon the second slot format combination not being divided by the second number, the UE discards the second slot format combination in the second DCI.

10. The method of claim 9, wherein the UE does not apply the slot format combination in the first DCI.

11. The method of claim 9, wherein the first SCS configuration is used for indicating slot format of one or more slots for the DL BWP, and the second SCS configuration is used for indicating slot format of one or more slots for the UL BWP.

12. The method of claim 9, wherein the second number is $M^{th}$ power of 2 plus 1 ($2^M+1$), wherein M is the absolute value of the difference of a third value corresponding to the third SCS configuration and a fourth value corresponding to the fourth SCS configuration.

13. The method of claim 9, wherein the third SCS configuration is used for indicating slot format of one or more slots for the first UL carrier, and the fourth SCS configuration is used for indicating slot format of one or more slots for the second UL carrier.

14. The method of claim 9, wherein the UE does not apply the second slot format combination in the second DCI.

15. A network, comprising:
a control circuit;
a processor installed in the control circuit; and
a memory installed in the control circuit and operatively coupled to the processor;
wherein the processor is configured to execute a program code stored in the memory to:
configure a DL (Downlink) BWP (Bandwidth Part) and an UL (Uplink) BWP in a first serving cell to a UE (User Equipment);
configure paired spectrum operation in the first serving cell to the UE;
configure an amount of slot format values in a slot format combination, wherein the configuring the amount of slot format values is based upon a determination, by the network, that the amount of slot format values is divisible by a first number corresponding to an absolute value of a difference between a first SCS (Subcarrier Spacing) configuration and a second SCS configuration;
transmit a first DCI (Downlink Control Information) to the UE, wherein the first DCI comprises the slot format combination indicating one or more slot format values for the DL BWP and one or more slot format values for the UL BWP;
configure a first UL carrier and a second UL carrier in a second serving cell to the UE;
configure an unpaired spectrum operation in the second serving cell to the UE;
configure a second amount of slot format values in a second slot format combination, wherein the configuring the second amount of slot format values is based upon a determination that the second amount of slot format values is divisible by a second number corresponding to an absolute value of a difference of a third SCS configuration and a fourth SCS configuration; and
transmit a second DCI to the UE, wherein the second DCI comprises the second slot format combination indicating one or more slot format values for the first UL carrier and one or more slot format values for the second UL carrier.

16. A User Equipment (UE), comprising:
a control circuit;
a processor installed in the control circuit; and
a memory installed in the control circuit and operatively coupled to the processor;
wherein the processor is configured to execute a program code stored in the memory to:
be configured, by a network, with a DL (Downlink) BWP (Bandwidth Part) and an UL (Uplink) BWP in a first serving cell;
be configured, by the network, with a paired spectrum operation in the first serving cell;
monitor a first DCI (Downlink Control Information), wherein the first DCI comprises a slot format combination indicating one or more slot format values for the DL BWP and one or more slot format values for the UL BWP;
receive the first DCI, wherein an amount of slot format values in the slot format combination is not divided by a first number, wherein the first number is associated with an absolute value of a difference of a first SCS (Subcarrier Spacing) configuration and a second SCS configuration;
based upon the slot format combination not being divided by the first number, discard the slot format combination in the first DCI;
be configured, by the network, with a first UL carrier and a second UL carrier in a second serving cell;
be configured, by the network, with an unpaired spectrum operation in the second serving cell;
monitor a second DCI, wherein the second DCI comprises a second slot format combination indicating one or more slot format values for the first UL carrier and one or more slot format values for the second UL carrier;
receive the second DCI, wherein an amount of slot format values in the second slot format combination is not divided by a second number, wherein the second number is associated with absolute value of difference of a third SCS configuration and a fourth SCS configuration; and
based upon the second slot format combination not being divided by the second number, discard the second slot format combination in the second DCI.

* * * * *